United States Patent
Flynn et al.

(10) Patent No.: US 10,173,521 B2
(45) Date of Patent: Jan. 8, 2019

(54) FUEL TANK VAPOR VALVE ASSEMBLY

(71) Applicant: Nissan North America, Inc., Franklin, TN (US)

(72) Inventors: Daniel Flynn, Brighton, MI (US); Jason Easter, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 215 days.

(21) Appl. No.: 15/222,033

(22) Filed: Jul. 28, 2016

(65) Prior Publication Data
US 2018/0029467 A1    Feb. 1, 2018

(51) Int. Cl.
| | |
|---|---|
| B60K 15/035 | (2006.01) |
| F02M 37/04 | (2006.01) |
| F16K 31/22 | (2006.01) |
| F16K 24/04 | (2006.01) |
| B60K 15/03 | (2006.01) |

(52) U.S. Cl.
CPC .. B60K 15/03519 (2013.01); B60K 15/03504 (2013.01); F02M 37/04 (2013.01); F16K 24/044 (2013.01); F16K 31/22 (2013.01); B60K 2015/03289 (2013.01); Y10T 137/3099 (2015.04)

(58) Field of Classification Search
CPC ........ Y10T 137/3099; B60K 15/03519; F16K 24/044
See application file for complete search history.

(56) References Cited

U.S. PATENT DOCUMENTS

| | | | |
|---|---|---|---|
| 4,694,857 A | 9/1987 | Harris | |
| 4,920,798 A | 5/1990 | Weaver | |
| 4,945,884 A | 8/1990 | Coha et al. | |
| 6,305,357 B1 | 10/2001 | Soukeras | |
| 6,533,002 B1* | 3/2003 | Kobayashi | B60K 15/03504 141/198 |
| 6,863,082 B1* | 3/2005 | McIntosh | B60K 15/03519 137/202 |
| 6,923,164 B1 | 8/2005 | Mitsudou et al. | |
| 7,089,954 B2 | 8/2006 | Crawford | |

(Continued)

FOREIGN PATENT DOCUMENTS

| | | |
|---|---|---|
| EP | 0297256 A2 | 1/1989 |
| EP | 1486662 A1 | 12/2004 |
| WO | 03-078823 A1 | 9/2003 |

*Primary Examiner* — Kevin Murphy
(74) *Attorney, Agent, or Firm* — Global IP Counselors, LLP

(57) ABSTRACT

A tube extends through an attachment section and defines a vapor passageway. A housing is supported to the attachment section for movement between several positions relative to the attachment section. The housing defines a float chamber below the tube. A valve seat portion is located within the float chamber and has an engagement part, a sleeve part and a seat surface. The engagement part is connected to the housing. The sleeve part telescopically engages the tube and is movable along the tube with the housing. The valve seat portion defines a central bore open to the vapor passageway and the seat surface. The float moves within the float chamber. When to fluid enters the float chamber the float floats up against the seat surface closing off the central bore and the vapor passageway. In the absence of fluid the float moves downward exposing the seat surface.

17 Claims, 16 Drawing Sheets

(56) References Cited

U.S. PATENT DOCUMENTS

| | | | | |
|---|---|---|---|---|
| 7,152,586 B2 * | 12/2006 | Aoki | ............... | B60K 15/03519 |
| | | | | 123/516 |
| 7,163,023 B2 * | 1/2007 | Spink | ................... | F16K 24/044 |
| | | | | 137/15.26 |
| 7,523,745 B2 | 4/2009 | Troxler et al. | | |
| 7,823,610 B2 * | 11/2010 | King | ............... | B60K 15/03504 |
| | | | | 137/202 |
| 8,042,564 B2 * | 10/2011 | Ando | ............... | B60K 15/03504 |
| | | | | 137/202 |
| 8,091,578 B2 | 1/2012 | Roth et al. | | |
| 2005/0155583 A1 | 7/2005 | Mitsudou et al. | | |

\* cited by examiner

FUEL TANK VAPOR VALVE ASSEMBLY

BACKGROUND

Field of the Invention

The present invention generally relates to a fuel pump assembly that includes a vapor valve assembly. More specifically, the present invention relates to a fuel pump assembly that includes vapor valve assembly that can be adjustably positioned to a plurality of locations and orientations relative to an attachment section of the fuel pump assembly.

Background Information

A fuel tank within a vehicle includes a sender unit with a float. The float moves in response to changes in the amount of fuel within the fuel tank sending signals to a fuel gauge such that the fuel gauge displays an indication of the amount of fuel remaining in the fuel tank. In many vehicles, the sender unit is structurally assembled with a fuel pump assembly. Fuel tanks vary in size and shape depending upon the design of the vehicle, and the space within a vehicle body structure that can receive the fuel tank. Further fuel tanks often include a baffle or baffles within the fuel receiving interior of the fuel tank in order to restrict movement of fuel therein. Typically, each fuel tank must have a unique sender unit and fuel pump assembly designed to fit within the fuel tank and be shaped to avoid contact with any baffle or baffles therein. Consequently, there are countless numbers of sender unit and fuel pump assembly designs and configurations.

SUMMARY

An object of the current disclosure is to provide a fuel pump assembly with vapor valve assembly that permits the vapor valve assembly to be easily re-oriented such that the vapor valve assembly and corresponding fuel pump assembly can be installed in any of a variety of differing fuel tank configurations and designs.

In view of the state of the known technology, one aspect of the present disclosure is to provide a fuel tank vapor valve assembly with an attachment section, at least one tube, a housing, a valve seat portion and a float. The attachment section has an upper surface and a lower surface. The at least one tube extends through the attachment section defining a vapor passageway that extends from the upper surface to a point below and spaced apart from the lower surface. The housing is supported to the attachment section for movement between at least a first position and a second position relative to the attachment section. The housing defines a float chamber below the at least one tube. The valve seat portion is located within the float chamber. The valve seat portion has an engagement part, a sleeve part, and a seat surface. The engagement part is coupled to the housing for movement therewith. The sleeve part is in telescoping engagement with the at least one tube such that the sleeve part telescopically moves along the at least one tube with the housing. The valve seat portion defines a central bore open to the vapor passageway and the seat surface. The float is freely movable within the float chamber such that in response to fluid entering the float chamber the float floats up against the seat surface closing off the central bore and the vapor passageway and in the absence of fluid moves downward in the float chamber exposing the seat surface and the central bore allowing vapor movement through the vapor passageway.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
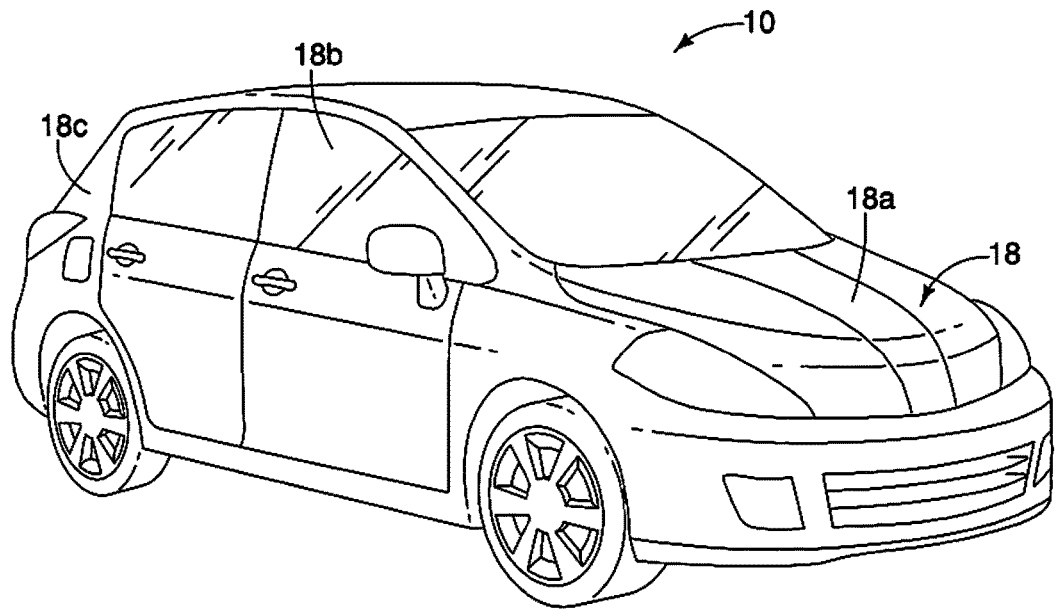
FIG. 1 is a perspective view of a vehicle that includes a fuel tank in accordance with a first embodiment.

Referring initially to FIG. 1, a vehicle 10 is illustrated in accordance with a first embodiment. As shown schematically in FIG. 2, the vehicle 10 includes a fuel tank 12 and a fuel pump assembly 14 (also referred to as a fuel pump and sender unit assembly). The fuel pump assembly 14 is configured such that portions thereof can undergo positioning adjustments in order to install the fuel pump assembly 14 is a variety of differing fuel tank shapes and configurations, as is described in greater detail below.

The vehicle 10 is depicted as a four door sedan. However, it should be understood from the drawings and the description below that the vehicle 10 can be any of a variety of vehicle designs, such as a pickup truck, a commercial van, a passenger van, coupe or SUV (sports utility vehicle). In particular, as described below, the fuel tank 12 of the vehicle 10 can have any of a variety of shapes and configurations.

The vehicle 10 includes, among other components, a vehicle body structure 18, an engine 20, a transmission 22, a controller 24, an instrument panel display 26, a fuel filler structure 28, a fuel vapor management system 30, the fuel tank 12 and the fuel pump assembly 14.

The vehicle body structure 18 includes an engine compartment 18a, a passenger compartment 18b and a cargo area 18c. The internal combustion engine 20 can be a gasoline powered engine, a diesel engine or a hybrid engine with both a hydrocarbon fuel power section and an electric power section. The transmission 22 can be an automatic transmission or a manual transmission.

The controller 24 can be, for example, an onboard computer that controls functions and operations of, for example, ignition, fuel consumption and emissions the engine 20, shifting of the transmission 22, operation of an air conditioning system (not show) and/or other vehicle components as needed or desired. The controller 24 can also be connected to the instrument panel display 26 and the fuel pump assembly 14 in order to display a current level of fuel in the fuel tank 12, as described in greater detail below.

The fuel filler structure 28 is a conventional structure that is positioned along an exterior surface of the vehicle body structure 18 and includes a filler tube 32 that extends to the fuel tank 12 in a conventional manner in order to direct fuel from outside the vehicle 10 to the fuel tank 12.

Figure 3:
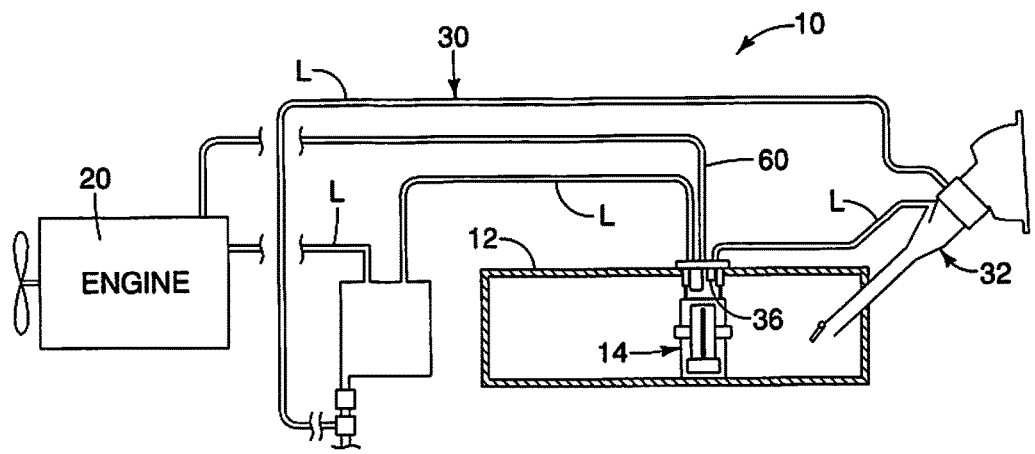
FIG. 3 is a schematic side view showing the engine of the vehicle, a fuel vapor management system, the fuel tank and the fuel pump and sender unit assembly in accordance with the first embodiment.

As shown in FIG. 3, the fuel vapor management system 30 is part of an overall emission control system of the vehicle 10. Since emission control systems and fuel vapor management systems are conventional features of vehicles, such as the vehicle 10, further description is omitted for the sake of brevity. Only those features necessary for understanding the fuel pump assembly 14 are described herein below.

Figure 2:
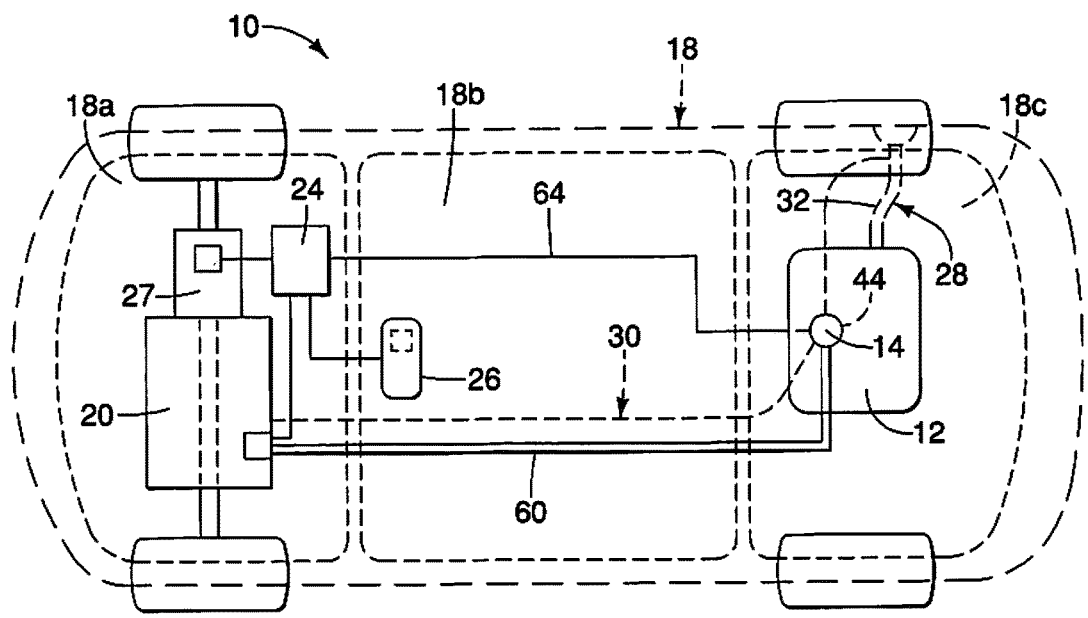
FIG. 2 is a schematic top view of the vehicle depicted in FIG. 1 showing elements of the vehicle including an engine, fuel line, the fuel tank, and a fuel pump and sender unit assembly in accordance with the first embodiment.
Figure 4:
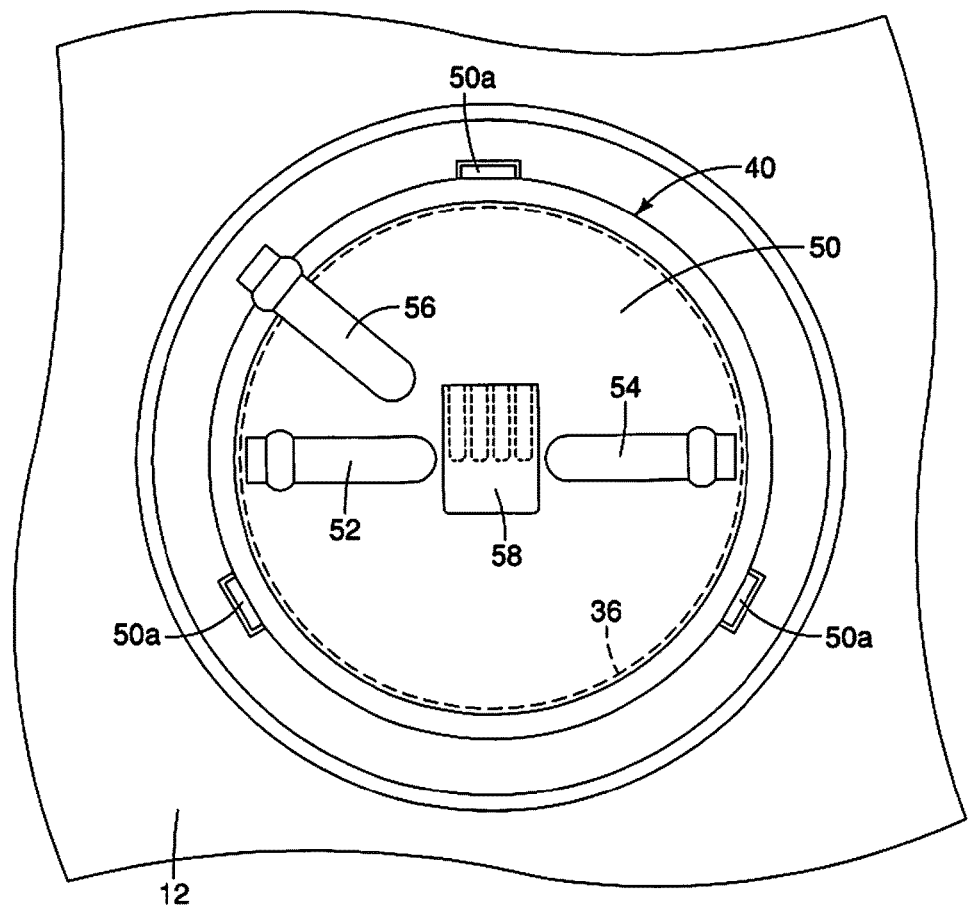
FIG. 4 is a top view of a portion of the fuel tank, showing an attachment plate of the fuel pump and sender unit assembly in accordance with the first embodiment.

The fuel tank 12 is shown schematically in FIG. 2. The fuel tank 12 is dimensioned and shaped to retain fuel (not shown) for the use by the engine 20. The fuel tank 12 is a sealed vessel that includes an opening 36 defined along an upper wall thereof. As shown in FIG. 4, the fuel tank 12 includes a flange 38 that surrounds the opening 36. The opening 36 is configured to receive and attach to the fuel pump assembly 14 in a conventional manner. Once the fuel pump assembly 14 is installed to the opening 36, the fuel tank 12 is sealed in a conventional manner. The fuel tank 12 can have many different shapes and configurations, as is described further below after a description of portions of the fuel pump assembly 14.

As shown in FIGS. 4-8, when removed from the fuel tank 12, the fuel pump assembly 14 basically includes an attachment section 40, a pump section 42, a sender unit section 44 and a vapor valve section 46.

As shown in FIG. 4, the attachment section 40 of the fuel pump assembly 14 includes a disk shaped plate 50 that is configured to fixedly attach the fuel pump assembly 14 to the fuel tank 12, with the pump section 42 extending downward into the fuel tank 12. An outer periphery of the plate 50 defines an attachment flange for attaching to the fuel tank 12. The plate 50 can optionally include one or more alignment projections 50a. The plate 50 further has an exterior side 50b and an interior side 50c. The plate 50 also includes a first tube 52, a second tube 54, a fuel tube 56 a connector 58 and the vapor valve section 46 (as described further below). The first tube 52 and the second tube 54 extend through the plate 50 from the exterior side 50b to the interior side 50c. The first tube 52 and the second tube 54 are dimensioned and arranged to allow movement of fuel vapors in and/or out of the fuel tank 12 through the vapor valve section 46, as is described further below.

Figure 5:
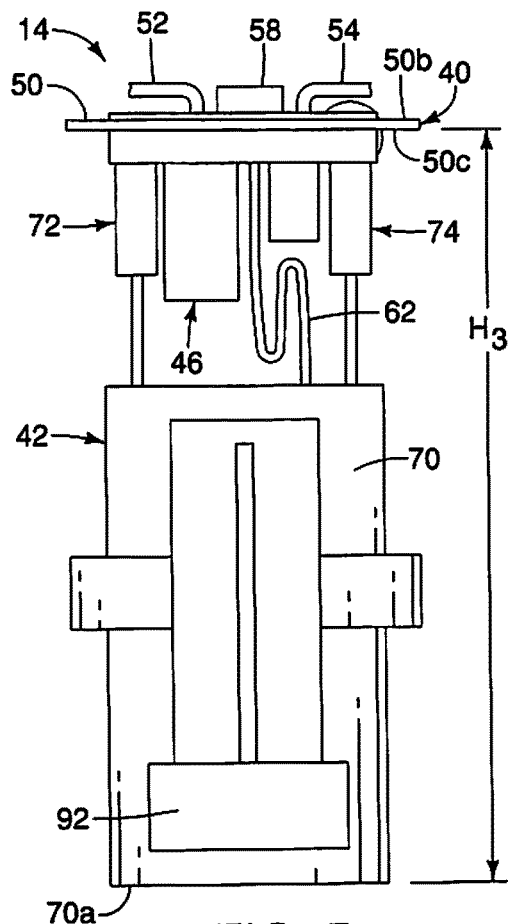
FIG. 5 is a side schematic view of the fuel pump and sender unit assembly removed from the vehicle showing a fuel pump housing in a first position relative to the attachment plate in accordance with the first embodiment.
Figure 6:
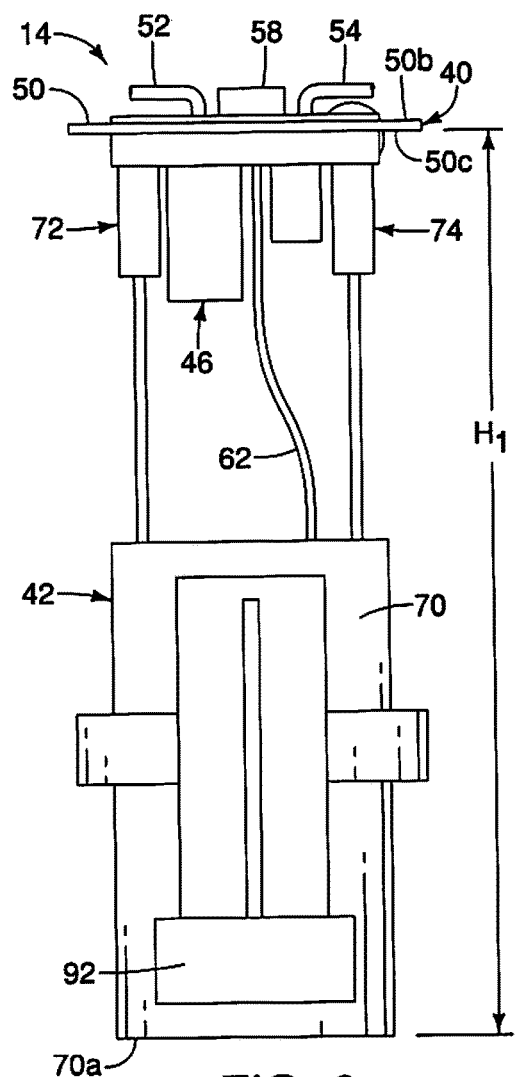
FIG. 6 is another side schematic view of the fuel pump and sender unit assembly similar to FIG. 5 showing the fuel pump housing in a second position relative to the attachment plate in accordance with the first embodiment.

The fuel tube 56 also extends through the plate 50 from the exterior side 50b to the interior side 50c. A first end of the fuel tube 56 is connected via a fuel line 60 to the engine 20, as shown in FIG. 3, and a second end connected to a flexible line 62 which is in turn connected to the pump section 42 as shown in FIGS. 5 and 6, and described in greater detail below. The connector 58 is configured to attach to a connector (not shown) of a wiring harness 64 that includes various electrical wires thereby electrically connecting the controller 24 with the fuel pump assembly 14. More specifically, the wiring harness 64 includes wires that connect the sender unit section 44 with the controller 24 in order to provide fuel level indicating signals from the sender unit section 44, and include wires that connect the controller 24 to the pump section 42, selectively providing power to the pump section 42 thereby powering a fuel pump 76 of the pump section 42.

A description of the pump section 42 is now provided with specific reference to FIGS. 5-8. The pump section 42 includes a housing 70, a first telescoping section 72, a second telescoping section 74 and the fuel pump 76. The fuel pump 76 is located within the interior of the housing 70 and is configured to draw fuel out of the fuel tank 12 and deliver it to the engine 20 in a conventional manner. The fuel pump 76 can be any of a variety of designs, such as an impeller type pump, a piston type pump or other pump configuration that can pump liquid from one location to another locations. Since fuel pumps are convention vehicle components, further description is omitted for the sake of brevity.

The housing 70 includes a fuel pump outlet 76a connected to the flexible line 62 such that fuel pumped from fuel pump 76 within the housing 70 moves through the flexible line 62, through the fuel tube 56, further through the fuel line 60 and to the engine 20. The sender unit section 44 is adjustably installed to an outer surface of the housing 70 in a manner described in greater detail below.

The housing 70 also includes a pair of support bores 78. The housing 70 is supported to the plate 50 of the attachment section 40 via the first telescoping section 72 and the second telescoping section 74, as shown in FIGS. 5-8. The first telescoping section 72 and the second telescoping section 74 are basically identical structures, each having an upper telescoping section 80, a support rod 82, a first spring 84 and a second spring 86. Therefore, description of one of the first telescoping section 72 and the second telescoping section 74 applies equally to the other.

The upper telescoping sections 80 are rigidly fixed to the plate 50 by, for example, welding techniques or mechanical fasteners (not shown). The upper telescoping sections 80 basically define outer portions of respective telescoping structures. Specifically, upper ends of the support rods 82 extend into bores 80a of the upper telescoping section 80 such that the support rods 82 are vertically moveable relative to the upper telescoping sections 80, as demonstrated by the relative movement depicted in FIGS. 7 and 8. The first springs 84 are disposed within respective ones of the bores 80a. The first springs 84 are located above respective ones of the support rods 82 such that each of the first springs 84 is confined between the interior side 50c (a lower surface) of the plate 50 within the bore 80a and a top surface of the support rod 82. Hence, the support rods 82 are biased for downward telescoping movement relative to the upper telescoping sections 80. In other words, the first springs 84 (biasing members) urge the support rods 82 away from the attachment section 40.

Figure 7:
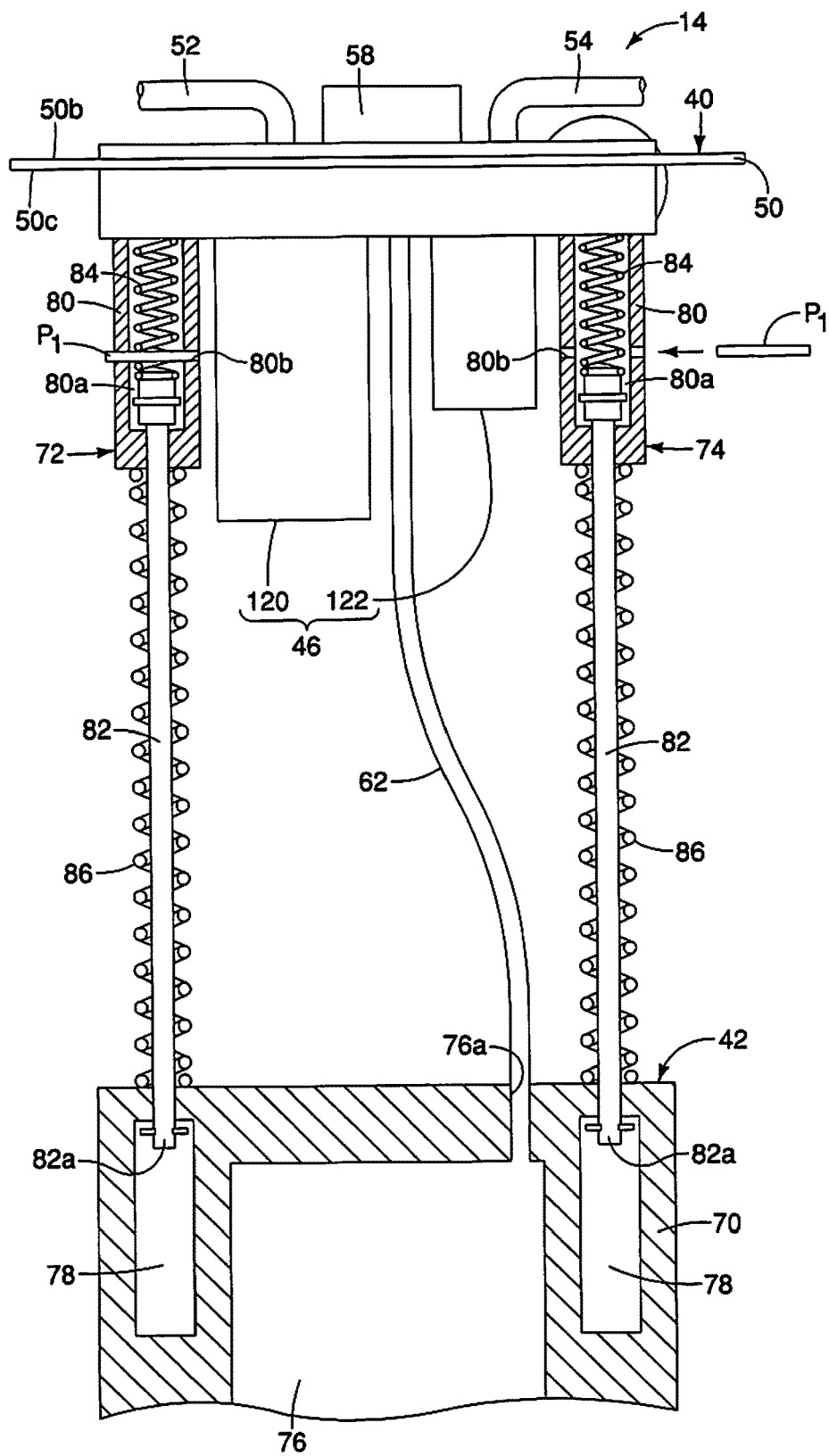
FIG. 7 is a side cross-sectional view of the fuel pump and sender unit assembly showing details of first and second telescoping sections configured to allow vertical positioning of the fuel pump housing relative to the attachment plate with the fuel pump housing in the second position (FIG. 6) in accordance with the first embodiment.
Figure 8:
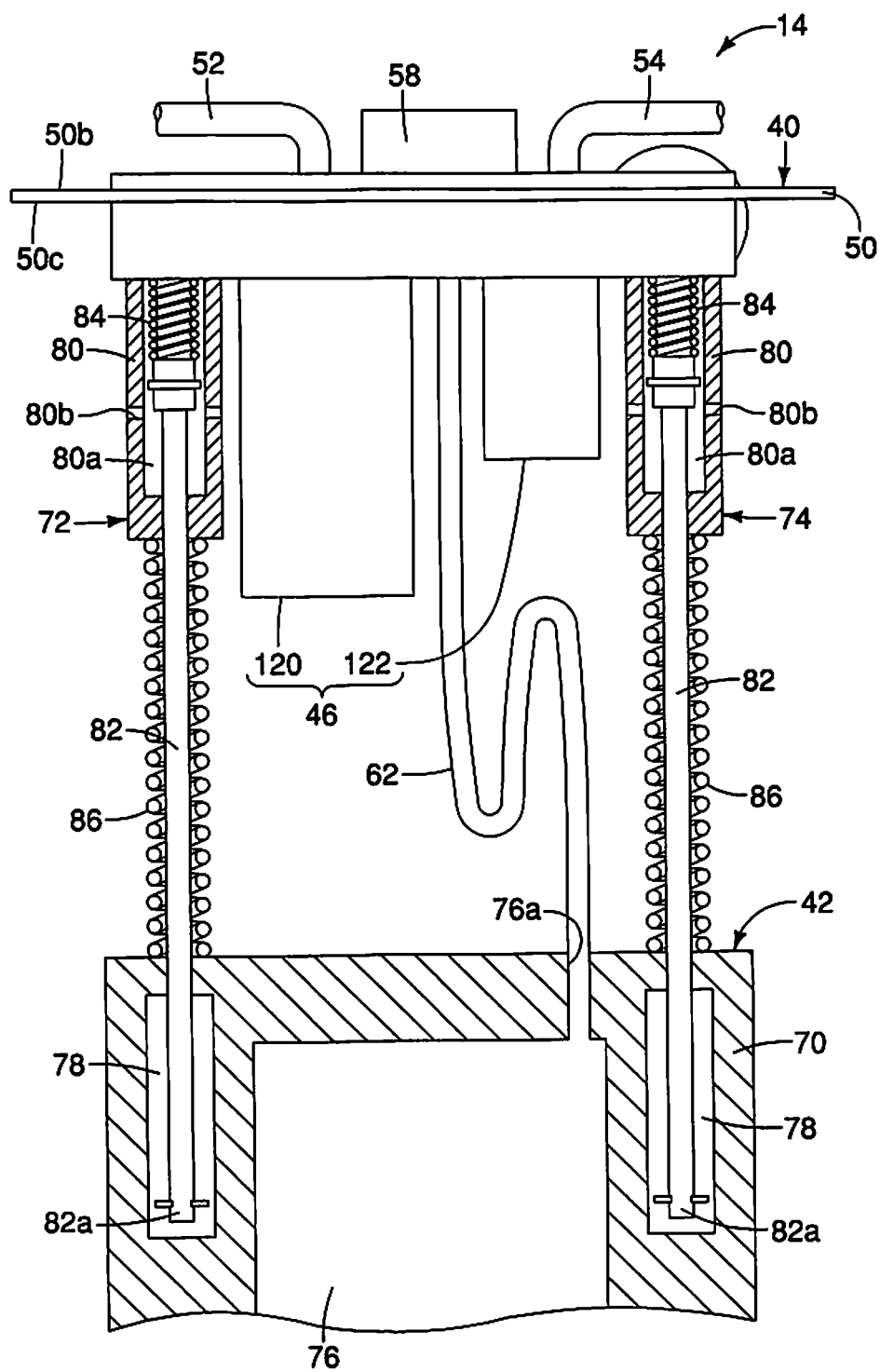
FIG. 8 is another side cross-sectional view of the fuel pump and sender unit assembly similar to FIG. 7 showing the details of first and second telescoping sections configured to allow vertical positioning of the fuel pump housing relative to the attachment plate with the fuel pump housing in the first position (FIG. 5) in accordance with the first embodiment.

The upper telescoping sections 80 (the outer portion) of the telescoping structures 72 and 74 each include an aperture 80b that extends in a direction perpendicular to and through the bore 80a. The aperture 80b is dimensioned to receive an optional locking pin $P_1$ insertable into the aperture 80b such that with the locking pin $P_1$ inserted into the aperture 80b the locking pin $P_1$ limits overall movement of the support rod 82 relative to upper telescoping section 80 (the outer portion) as indicated in FIG. 7.

A lower portion 82a of each of the support rods 82 extends into a corresponding one of the support bores 78 of the housing 70 such that the support rods 82 can undergo telescoping movement with respect to the housing 70. The second springs 86 are disposed about each of the support rods 82 and are confined between the upper telescoping section 72 and the housing 70. Consequently, the housing 70 is biased by the second springs 86 to move downward away from the attachment section 40.

Figure 9:
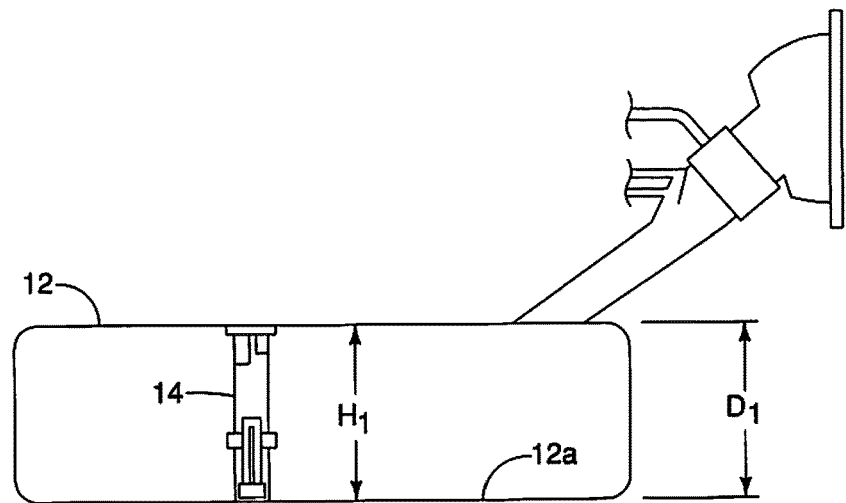
FIG. 9 is a schematic side view of a first example of a fuel tank with the fuel pump and sender unit assembly installed therein in accordance with the first embodiment.

The fuel pump assembly 14 is installed to the fuel tank 12 such that the pump section 42 is inserted through the opening 36 into the fuel tank 12 until the plate 50 contacts the flange 38. A locking ring (not shown) attaches to the flange 38 in a conventional manner, fixing the plate 50 and the fuel pump assembly 14 to the fuel tank 12. During installation of the fuel pump assembly 14, a lower surface 70a (FIGS. 5 and 6) of the housing 70 contacts and can be pressed against a bottom interior surface 12a of the fuel tank 12 (FIG. 9). Depending upon the overall height of the fuel pump assembly 14 and the overall depth of the fuel tank 12, it is possible for the first and second telescoping section 72 and 74 to undergo compressive telescoping movement (the first and second springs 84 and 86 can be compressed) thereby changing an overall height of the fuel pump assembly 14.

Figure 10:
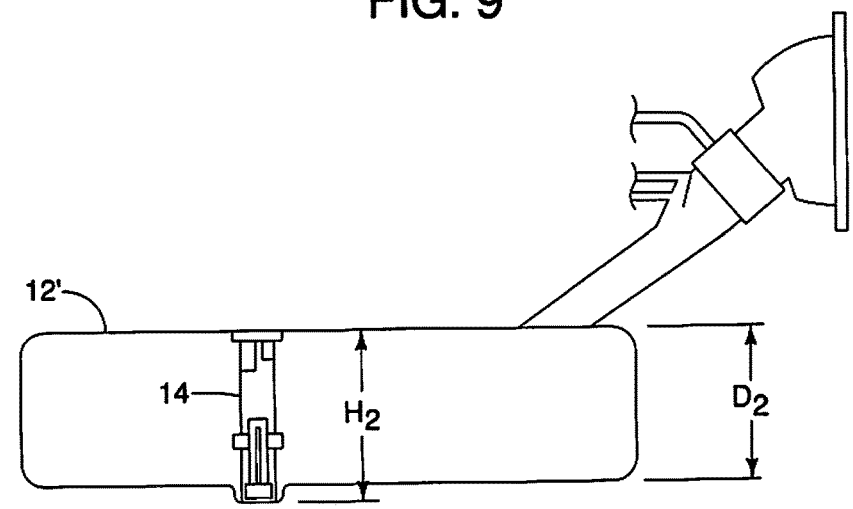
FIG. 10 is a schematic side view of a second example of a fuel tank with the fuel pump and sender unit assembly installed therein in accordance with the first embodiment.
Figure 11:
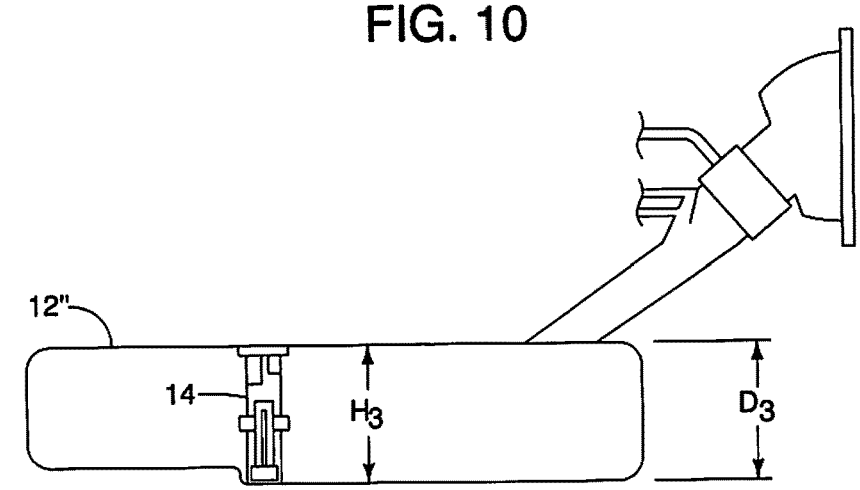
FIG. 11 is a schematic side view of a third example of a fuel tank with the fuel pump and sender unit assembly installed therein in accordance with the first embodiment.

As described above, the first and second telescoping sections 72 and 74 allow for movement of the housing 70 of the pump section 42 relative to the attachment section 40 and the plate 50. In other words, the fuel pump assembly 14 is a multi-application assembly that can be used in a variety of fuel tank configurations. For example, FIGS. 9, 10 and 11 show several possible configurations of fuel tanks. The fuel pump assembly 14 is configured to be installed in any of a plurality of fuel tank designs. FIGS. 9, 10 and 11 show only three possible fuel tank designs. It should be understood from the drawings and description herein, that the fuel pump assembly 14 can be used in many different fuel tank designs and configurations.

For example, in FIG. 9, the fuel tank 12 has an overall depth $D_1$ that is such that when the fuel pump assembly 14 is installed therein, the fuel pump assembly 14 has an overall height $H_1$. In FIG. 6, the fuel pump assembly 14 is shown with the first and second telescoping sections 72 and 74 fully extended. In other words, both FIGS. 6 and 9 show the fuel pump assembly 14 at the overall height $H_1$ representing a maximum height thereof. In FIG. 10, the fuel pump assembly 14 is installed to an alternative fuel tank 12'. The fuel tank 12' has an overall depth $D_2$ that is less than the overall depth $D_1$ of the fuel tank 12. Consequently, when the fuel pump assembly 14 is installed to the fuel tank 12', the fuel pump assembly 14 has an overall height $H_2$ that is less than the overall height $H_1$. The first and second telescoping sections 72 and 74 are compressed in the installation orientation shown in FIG. 10.

In FIG. 11, the fuel pump assembly 14 is installed to yet another alternative fuel tank 12". The fuel tank 12" has an overall depth $D_3$ that is less than the overall depth $D_1$ and the overall depth $D_2$. Consequently, when the fuel pump assembly 14 is installed to the fuel tank 12", the fuel pump assembly 14 has an overall height $H_3$ that is less than the overall height $H_1$ and the overall height $H_2$. The first and second telescoping sections 72 and 74 are fully compressed in the configuration shown in FIG. 11. Similarly, FIG. 5 also shows the fuel pump assembly 14 with the overall height $H_3$ that represents a minimum height thereof.

It should be understood from the drawings and the description herein that the fuel pump assembly 14 can be installed in a significant number of fuel tank configurations and is not limited to the three examples of fuel tanks depicted in FIG. 9-11. More specifically, since the first and second telescoping sections 72 and 74 allow the pump section 42 of the fuel pump assembly 14 to move relative to the attachment section 40, the fuel pump assembly 14 can have any of dozens of overall heights ranging between the overall height $H_3$ and the overall height $H_1$.

A description of the sender unit section 44 is now provided with specific reference to FIGS. 12-22. The sender unit section 44 is attached to the housing 70 of the pump section 42 of the fuel pump assembly 14. Specifically, the sender unit section 44 is connected to the housing 70 such that a sender unit 90 having a float 92 can be adjustably positioned in a plurality of orientations relative to the housing 70, and the plate 50 of the attachment section 40. More specifically, the entire sending unit 90 can be positioned at any of a plurality of circumferentially spaced apart locations about the housing 70 (a first direction—a horizontally oriented direction). Further, the sending unit 90 can be moved and positioned vertically (a second direction perpendicular to the first direction) to any of a plurality of locations relative to the housing 70.

The sender unit section 44 includes a first positioning mechanism 94, a second positioning mechanism 96 and the sender unit 90. The first positioning mechanism 94 is supported on the housing 70. The housing 70 has an outer surface 70*b* that is cylindrical in shape, or has a portion thereof that has an annular cylindrical shape. The first positioning mechanism 94 has a housing engaging part 100 and a retaining mechanism 102. The housing engaging part 100 has an annular shape and extends completely around the outer surface 70*b* of the housing 70. The housing engaging part 100 can be made of two half annular elements that are fastened together via mechanical fasteners (not shown) to form the complete annular ring that defines the housing engaging part 100. The housing engaging part 100 is rotatably movable in the first direction relative to the housing 70. Specifically, the first direction is a horizontal and circular direction relative to the housing 70. As shown schematically in FIGS. 12-14, the housing engaging part 100 is shown in a first position relative to the housing 70. As shown schematically in FIGS. 15-17, the housing engaging part 100 is rotated to a second position relative to the housing 70 that is approximately 90 degrees offset from the first position.

Figure 16:
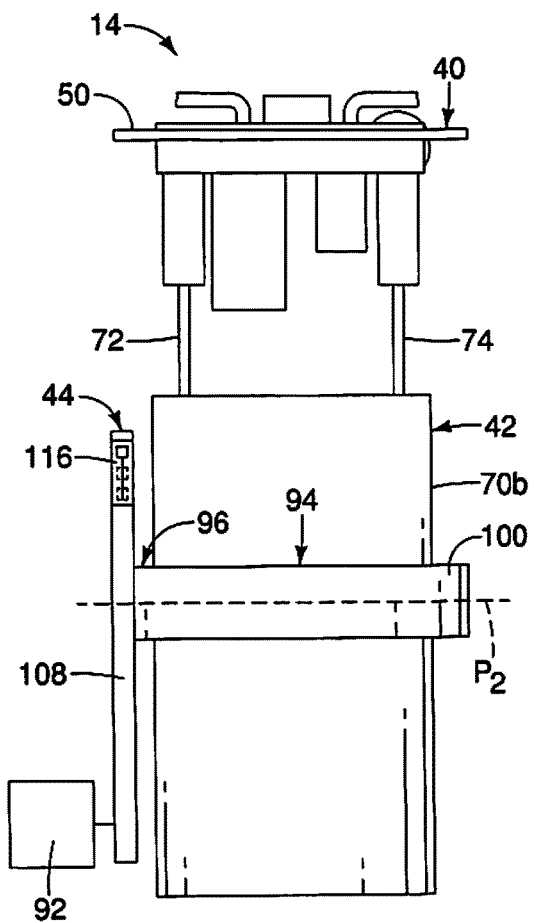
FIG. 16 is another schematic side view of the fuel pump and sender unit assembly similar to FIGS. 12-15 showing the sender unit in the second orientation relative to the fuel pump housing, and with the sender unit in one of a plurality of intermediate vertical positions via function of the second positioning mechanism in accordance with the first embodiment.
Figure 17:
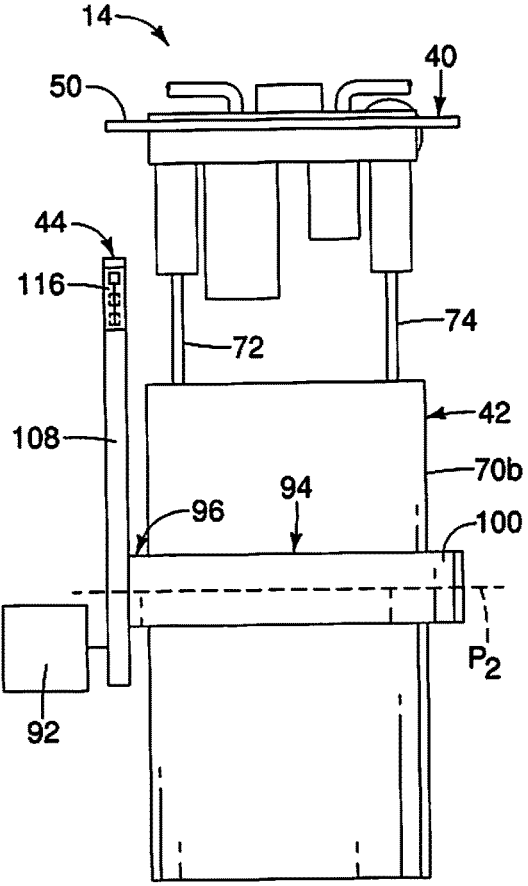
FIG. 17 is another schematic side view of the fuel pump and sender unit assembly similar to FIGS. 12-16 showing the sender unit in the second orientation relative to the fuel pump housing, and with the sender unit in an uppermost vertical position via function of the second positioning mechanism in accordance with the first embodiment.
Figure 18:
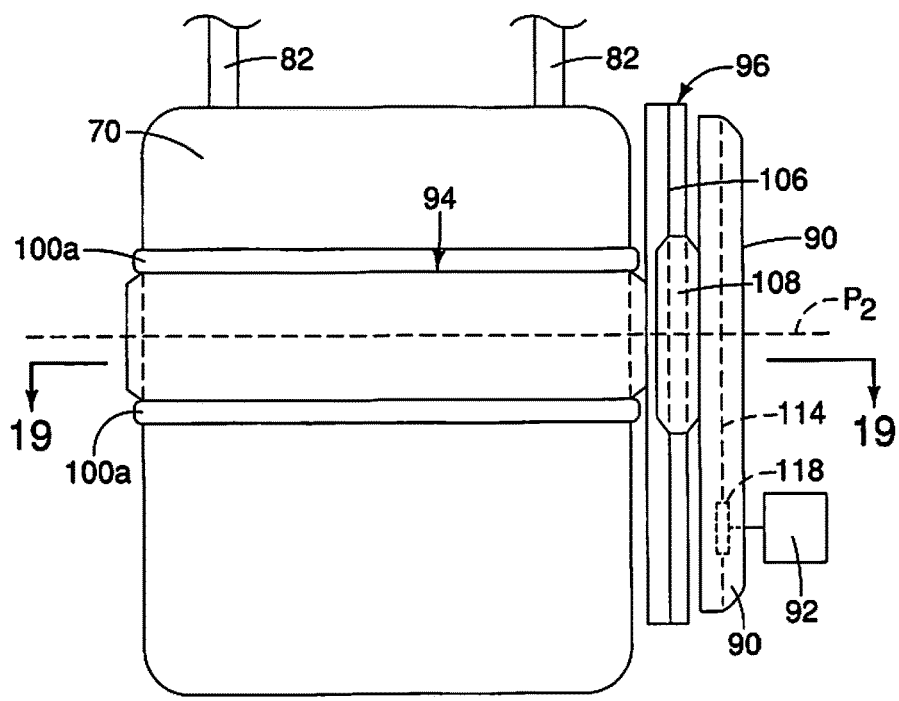
FIG. 18 is a side view of portions of the fuel pump and sender unit assembly showing details of the first positioning mechanism and the second positioning mechanism of the sender unit in accordance with the first embodiment.

From the side view in FIGS. 12-17, it is shown that the housing engaging part 100 remains along a horizontally extending plane $P_2$ (FIG. 12) defined on the housing 70. In other words, the housing engaging part 100 does not move in a vertical direction, but remains in positions that intersect with the horizontal plane $P_2$. As shown in FIG. 18, the housing engaging part 100 can be retained in positions intersecting with the horizontal plane $P_2$ by, for example, rings 100*a* mounted to the housing 70 above and below the housing engaging part 100, thereby restricting vertical movement. The rings 100*a* can be attached to the housing 70 by fasteners (not shown), can be force fitted to the housing 70 or can be integrally molded with the housing 70.

Figure 19:
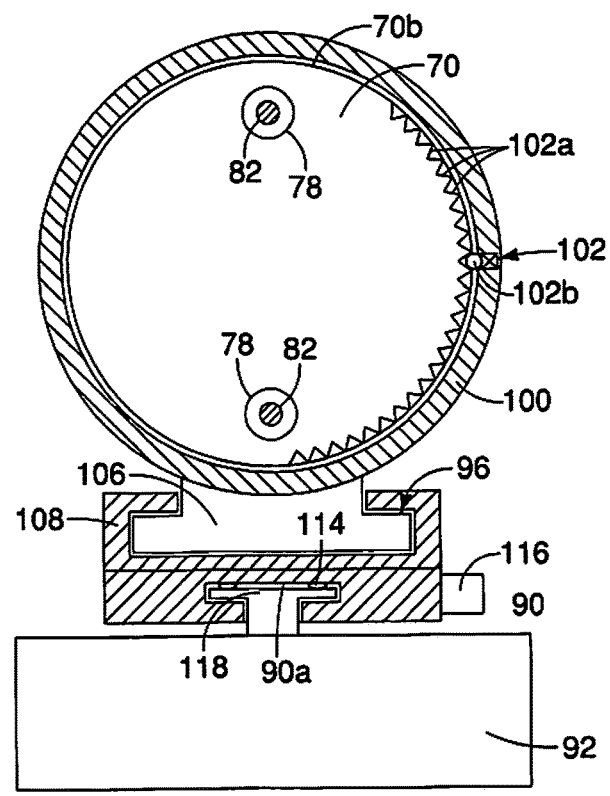
FIG. 19 is a top cross-sectional view of the fuel pump and sender unit assembly showing further details of the first positioning mechanism and the second positioning mechanism of the sender unit in accordance with the first embodiment.

The rotary movement of the housing engaging part 100 about the housing 70 is restricted by the retaining mechanism 102 shown in FIG. 19. The retaining mechanism 102 is configured to retain the first positioning mechanism 100 in any one of a plurality of positions relative to the outer surface of the housing. One example of the retaining mechanism 102 shown in FIG. 19 is such that the outer surface 70*b* is provided with or formed with a plurality of gear teeth or recesses 102*a* and the housing engaging part 100 include a spring biased ball detent 102*b* (a resilient projection). The ball detent 102*b* is continuously urged into contact with the recesses 102*a* restricting movement of the housing engaging part 100 relative to the housing 70. A predetermined amount of force applied to the housing engaging part 100 overcomes the biasing forces acting on the ball detent 102*b* allowing positioning of the housing engaging part 100 relative to the housing 70. Hence, the housing engaging part 100 can be rotated about the housing 70 to any of a plurality of positions, limited only by the number and circumferential positioning of the recesses 102*a*.

It should be understood from the drawings and the description herein that the relative locations of the recesses 102*a* and the ball detent 102*b* can be switched. Specifically, the recesses 102*a* can be formed on the housing engaging part 100 and the ball detent 102*b* can be located on the housing 70. More specifically, one of the outer surface 70*b* of the housing 70 and the housing engaging part 100 includes the ball detent 102*b* (the resilient projection) and the other of the outer surface 70*b* of the housing 70 and the housing engaging part 100 includes the plurality of recesses 102*a*. Hence, in response to rotation of the housing engaging part 100 about the outer surface 70*b* of the housing 70 the ball detent 102*b* (the resilient projection) is moved relative to the plurality of recesses 102*a* from engagement with one of the plurality of recess 102a to engagement with another of the plurality of recesses 102a.

It should also be understood from the drawings and the description that alternative mechanisms for restricting movement of the housing engaging part 100 relative to the housing 70 can be employed, such as a clamping mechanism, or a locking mechanism. The first positioning mechanism 94 is only operated upon installation of the fuel pump assembly 14 to the fuel tank 12. In other words, the first positioning mechanism 94 need not be overly complex and is only intended to be operated once to position the sender unit 90 relative to the housing 70 as the fuel pump assembly 14 is installed into the fuel tank 12. As noted above, the fuel tank 12 can have any of a variety of shapes and configurations, and may include baffles (not shown) within its interior fuel carrying space. For some fuel tank installation applications, it can be necessary to re-position the sender unit 90 to a predetermined location in order to avoid a baffle, or avoid an irregularity in the bottom surface of the fuel tank 12.

Figure 15:
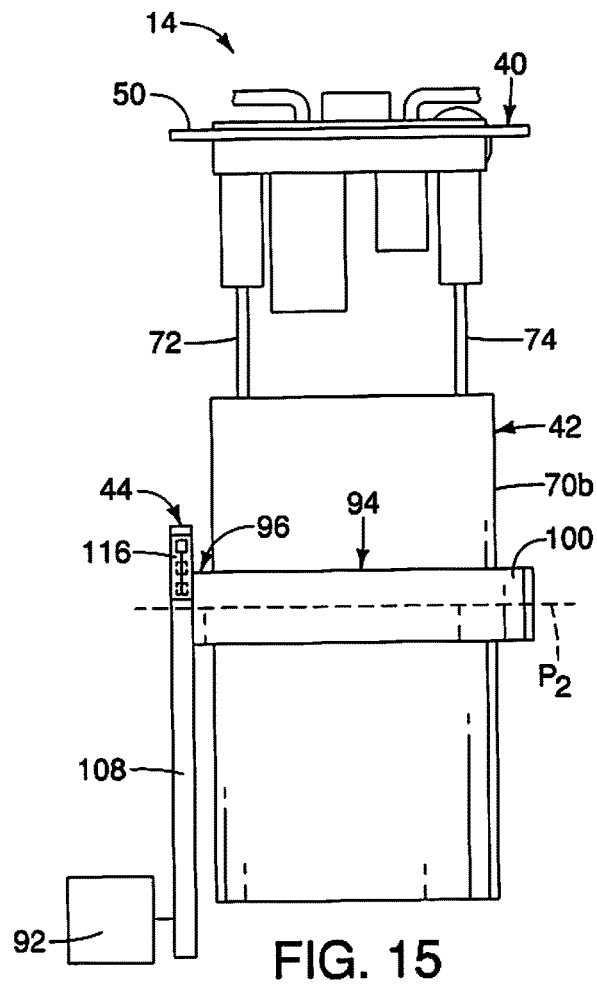
FIG. 15 is another schematic side view of the fuel pump and sender unit assembly similar to FIGS. 12-14 showing the sender unit in a second orientation relative to the fuel pump housing, with the sender unit being rotated approximately 90 degrees from the first orientation via a first positioning mechanism, and with the sender unit in a lower most vertical position via function of a second positioning mechanism in accordance with the first embodiment.
Figure 20:
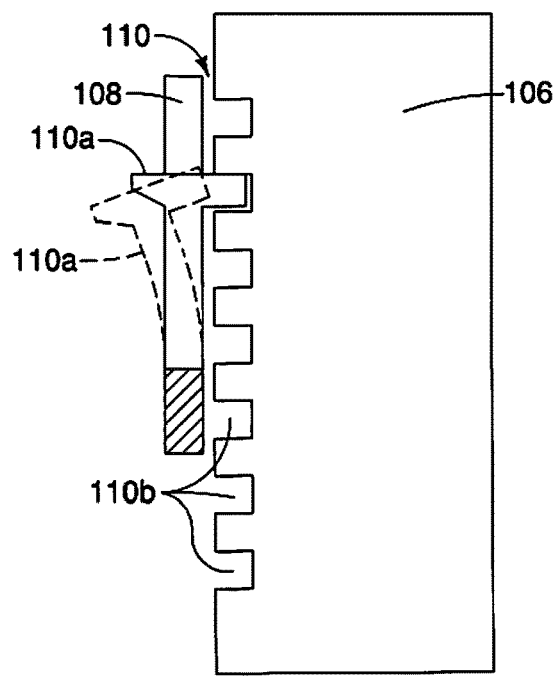
FIG. 20 is a cutaway view of a locking mechanism of the second positioning mechanism of the sender unit in accordance with the first embodiment.
Figure 21:
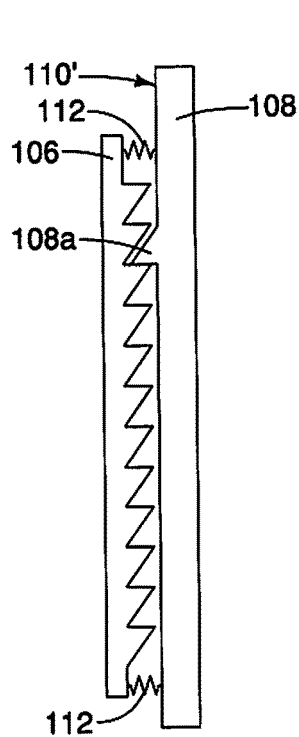
FIG. 21 is a cutaway view of a first alternate locking mechanism of the second positioning mechanism of the sender unit in accordance with the first embodiment.
Figure 22:
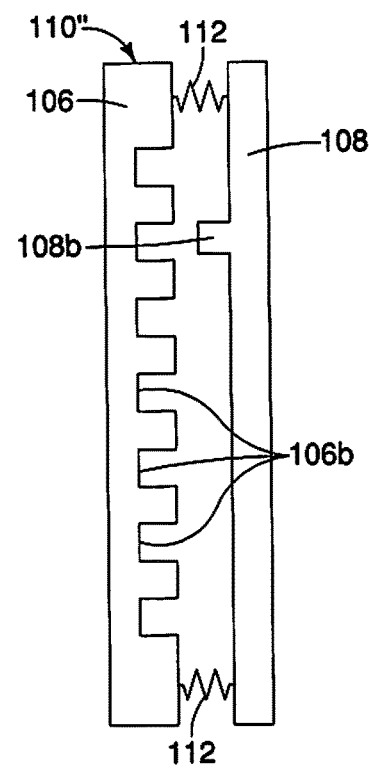
FIG. 22 is a cutaway view of a second alternate locking mechanism of the second positioning mechanism of the sender unit in accordance with the first embodiment.

As shown in FIGS. 18 and 19, the second positioning mechanism 96 includes a first part 106, a second part 108 and a locking mechanism 110 (FIGS. 20-22). The first part 106 is fixedly attached to the housing engaging part 100 of the first positioning mechanism 94 for movement with the housing engaging part 100. The second part 108 is coupled to the first part 106 such that the second part 108 can undergo linear movement in a vertical direction relative to the housing 70. Specifically, as shown in FIGS. 15, 16 and 17, the second part 108 (along with the sender unit 90) can be moved in vertical directions to a plurality of positions relative to the housing engaging part 100 and the housing 70. FIG. 15 shows the second part 108 and the sender unit 90 in a lower-most position. FIG. 16 shows the second part 108 and the sender unit 90 in one of a plurality of intermediate positions. FIG. 17 shows the second part 108 and the sender unit 90 in an upper-most position.

Movement of the second part 108 relative to the first part 106 is vertical movement, whereas the movement of the housing engaging part 100 relative to the housing 70 is horizontal/circular movement. Hence, the second positioning mechanism 96 allows for positioning of the sender unit 90 in a direction that is perpendicular to the positioning of the sender unit 90 provided by the first positioning mechanism 94.

The locking mechanism 110 shown in FIG. 20 is operable between an unlocked state and a locked state. In the unlocked state the second part 108 is movable relative to the first part 106 in vertical directions (up and down in the second direction) perpendicular to horizontal movement of the housing engaging part 100 (the first direction). In the locked state the second part 108 is non-movably fixed to the first part 106. The locking mechanism 110 can be any of a variety of mechanisms. For example, as shown in FIG. 20, the locking mechanism 110 can be a flexible locking tab 110a formed on a portion of the second part 108 that is insertable into any one of a plurality of recesses 110b formed along one edge of the first part 106. The flexible locking tab 110a is pulled back to the unlocked state (in phantom in FIG. 20) unlocking the second part 108 from the first part 106 allowing vertical movement and positioning of the sender unit 90. The flexible locking tab 110a resiliently moves into the adjacent one of the plurality of recesses 110b locking the second part 108 into position relative to the first part 106 (the locking state).

FIGS. 21 and 22 show alternatives to the locking mechanism 110. Specifically, in FIG. 21, a locking mechanism 110' includes biasing members 112 that urge the first part 106 and the second part 108 toward one another. In the alternative locking mechanism 110' in FIG. 21, the first part 106 includes a plurality of gear teeth or recesses 106a and the second part 108 includes at least one gear tooth or projection 108a that engages the recesses 106a. Force applied to the second part 108 moves the projection 108a out of the recesses 106a allowing movement of the second part 108 relative to the first part 106, thereby allowing the second part 108 and the sender unit 90 to be positioned vertically relative to the first part 106 and the housing 70. Similarly, in the alternative locking mechanism 110" in FIG. 22, the first part 106 includes a plurality of recesses 106b and the second part 108 includes at least one projection 108b that engages the recesses 106b. Force applied to the second part 108 moves the projection 108b out of the recesses 106b allowing movement of the second part 108 relative to the first part 106, thereby allowing the second part 108 and the sender unit 90 to be positioned vertically relative to the first part 106 and the housing 70.

Figure 12:
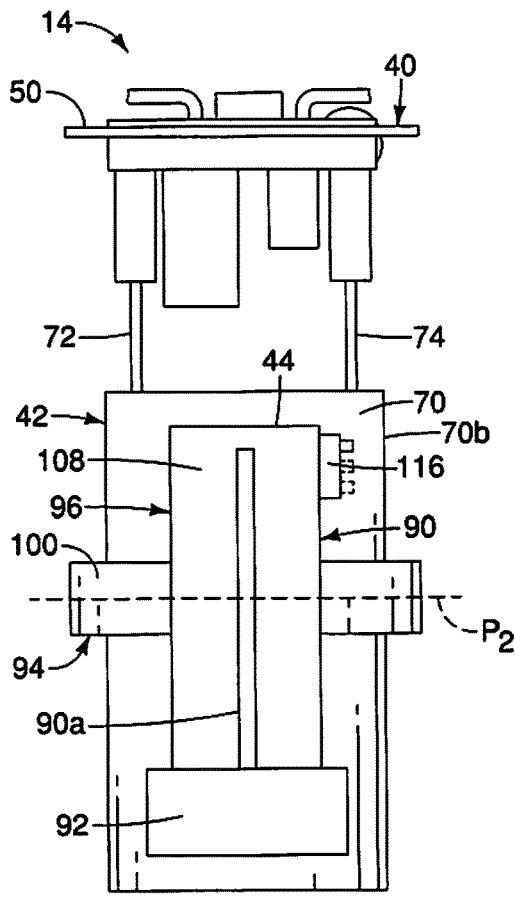
FIG. 12 is a schematic side view of the fuel pump and sender unit assembly similar to FIGS. 5 and 6 showing the sender unit in a first orientation relative to the fuel pump housing with a float of the sender unit in a fuel low position in accordance with the first embodiment.
Figure 13:
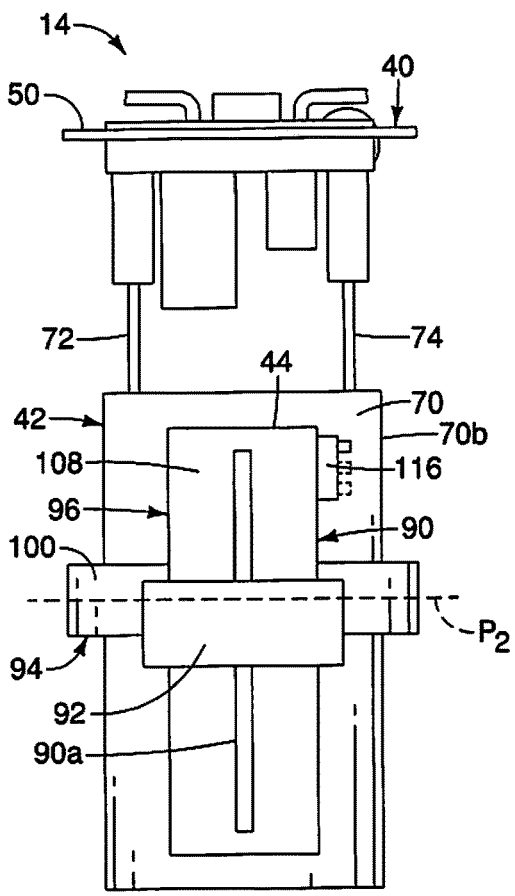
FIG. 13 is another schematic side view of the fuel pump and sender unit assembly similar to FIG. 12 showing the float of the sender unit in a mid-position in accordance with the first embodiment.
Figure 14:
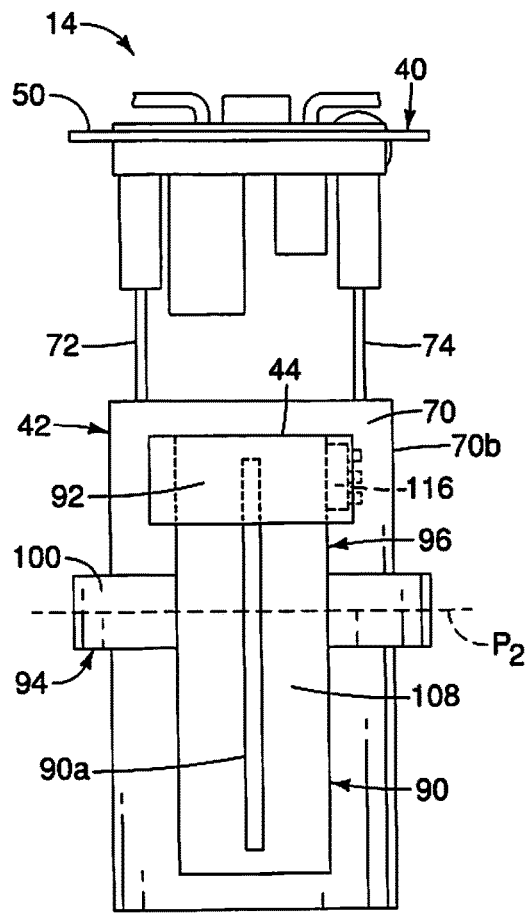
FIG. 14 is another schematic side view of the fuel pump and sender unit assembly similar to FIGS. 12 and 13 showing the float of the sender unit in a fuel tank full position in accordance with the first embodiment.

As shown in FIGS. 18 and 19, the sender unit 90 is fixedly attached to the second part 108 of the second positioning mechanism 96, such that the sender unit 90 moves with the second part 108 during positioning of the second part 108 relative to the first part 106. The sender unit 90 includes the float 92, a linear resistance panel 114 and a resistance setting switch 116. The sender unit 90 has a recessed area 90a. The float 91 is supported by a slider 118 that is retained within the recessed area 90a for linear sliding movement in vertical directions (up and down). The slider 118 is a first track part that is T-shaped projection as viewed in cross-section in FIG. 19. The recessed area 90a is basically a second track part that includes two opposing recesses dimensioned to receive and mate with the T-shaped projection of the slider 118. The slider 118 along with the float 92 can undergo linear vertical movement along the recessed area 90a (a slider track). Hence the slider 118 and the float 92 are movable between a plurality of positions along recessed area 90a (the slider track) as shown in FIGS. 12, 13 and 14. Specifically, FIGS. 12, 13 and 14 show the float 92 moved between various vertical positions along the recessed area 90a. The float 92 is configured to float along the surface of fuel in the fuel tank 12, thereby providing an indication of the amount of fuel in the fuel tank 12. The float 92 and the slider 118 are configured to move in an upward direction relative to the second part 108 of the second positioning mechanism 96 in response to changes in level of fuel.

Figure 23:
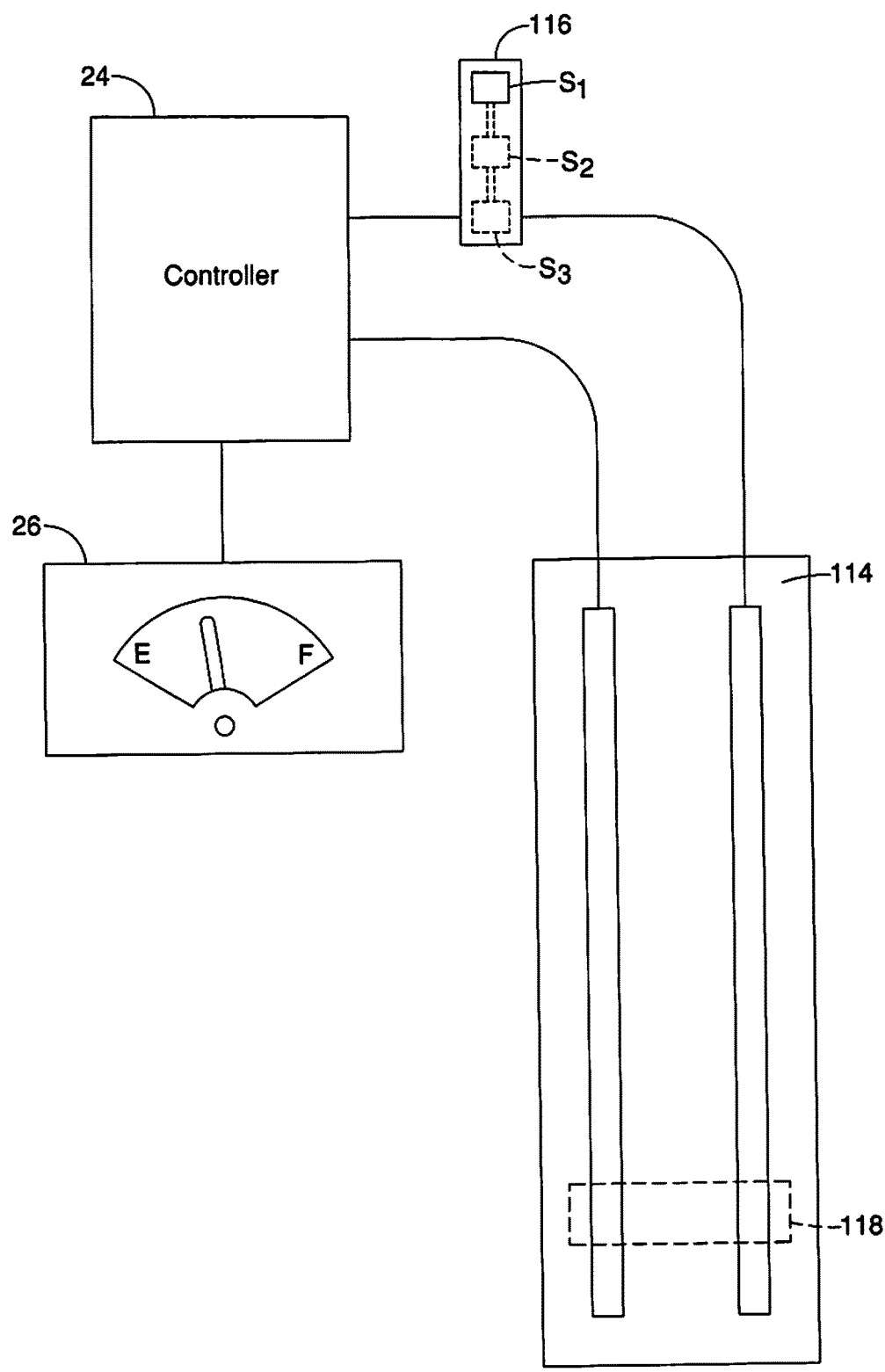
FIG. 23 is a schematic view of the sender unit and associated circuitry connecting the sender unit to a linear resistance panel and a resistance setting switch thereof to a controller and instrument panel display in accordance with the first embodiment.

The linear resistance panel 114 is a resistance measuring part that provides an electronic indication of electrical resistance at each of the plurality of positions of the float 92. The linear resistance panel 114 is located within the recessed area 90a of the sender unit 90. The slider 118 contacts the linear resistance panel 114 (a slider track) in a conventional manner completing a circuit that provides the controller 24 with differing resistance signals indicating fuel level. As described above, the fuel pump assembly 14 is designed for use in a plurality of differing fuel tank designs and also in a plurality of differing vehicle designs. Some vehicles determine fuel levels in its fuel tank based on one range of measured resistances and other vehicle can have a different range of resistances. As shown in FIG. 23, the resistance setting switch 116 is part of a circuit and includes is a multi-position switch such that in a first position $S_1$, the linear resistance panel 114 and the positioning of the slider 118 output resistances within a first range, with one end of the range being zero ohms, and a second end being a first predetermined ohm reading. In a second position $S_2$, the linear resistance panel 114 and the positioning of the slider 118 output resistances within a second range, with one end of the range being zero ohms, and a second end being a second predetermined ohm reading greater than the first predetermined ohm reading. Further, in a third position $S_3$, the linear resistance panel 114 and the positioning of the slider 118 outputs resistances within a third range, with one end of the range being zero ohms, and a third end being a third predetermined ohm reading that differs from both the first and second predetermined ohm readings.

A description is now provided for the vapor valve section 46 with specific reference to FIGS. 24-28. The vapor valve section 46 is part of the fuel vapor management system 30 shown in FIG. 3. The fuel vapor management system 30 captures hydrocarbon vapors from fuel and from the inlet of the filler tube 32 in a conventional manner. The fuel vapor management system 30 shown in FIG. 3 is a schematic rendering of a convention vapor management system. Since fuel vapor management systems are well known, further description is omitted for the sake of brevity.

Figure 24:
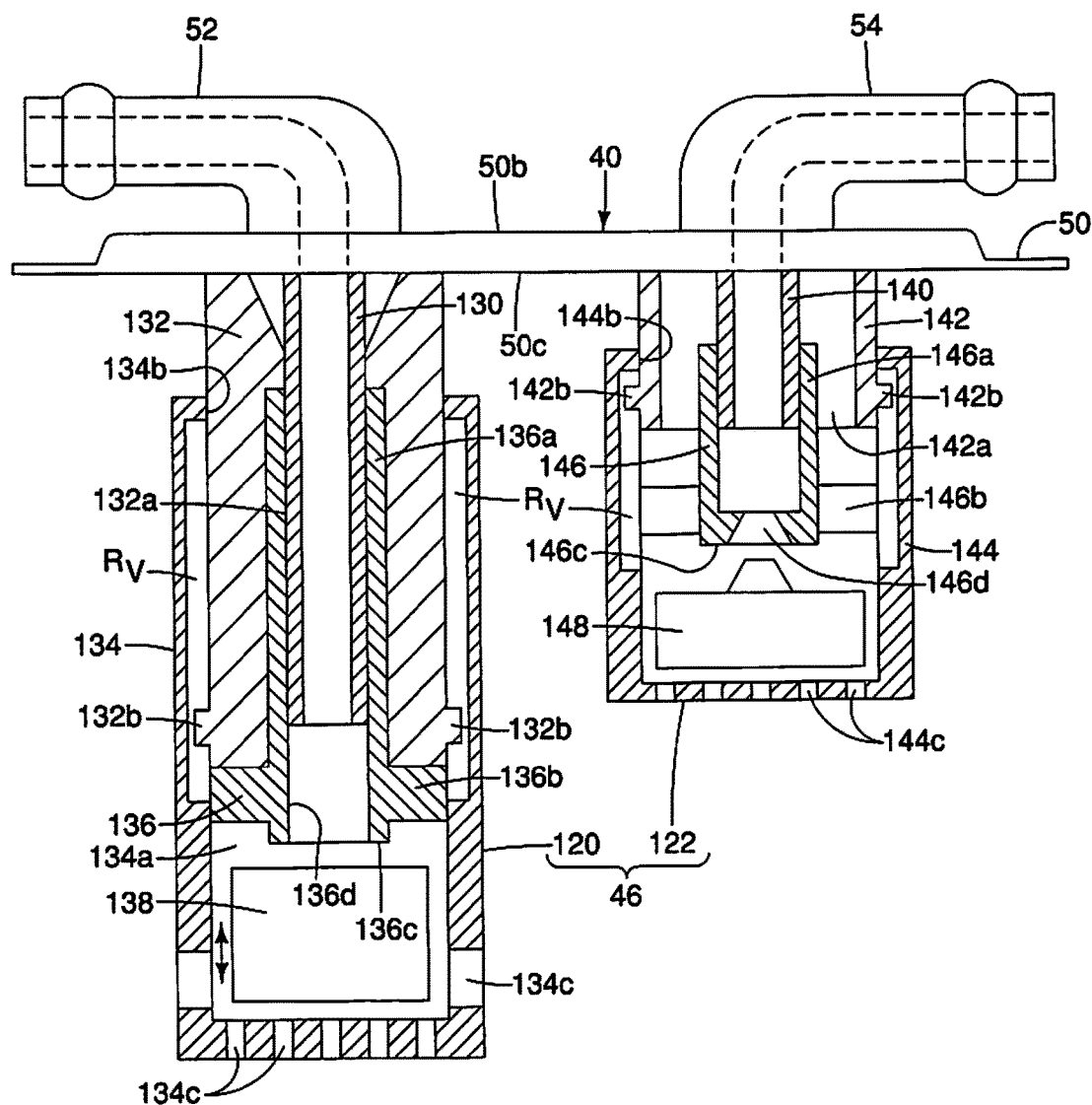
FIG. 24 is a cross-sectional view of a portion of the fuel pump and sender unit assembly showing a vapor valve section thereof with portions of the fuel pump and sender unit removed for clarity and simplicity, further showing a first valve assembly in a first vertical position and a second valve assembly in a first vertical position in accordance with the first embodiment.
Figure 25:
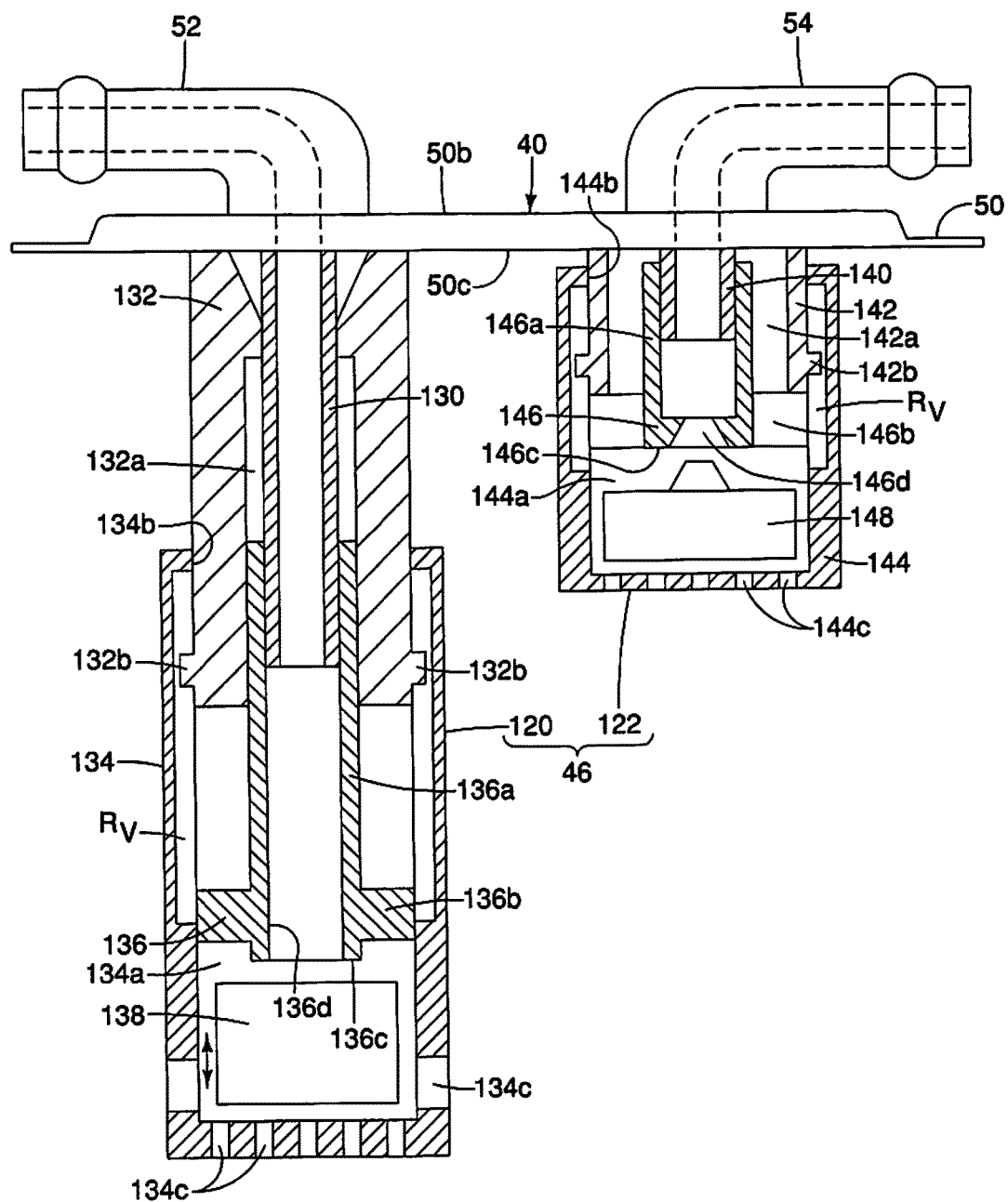
FIG. 25 is another cross-sectional view of the portion of the fuel pump and sender unit assembly depicted in FIG. 24 showing the first valve assembly moved to a second vertical position and the second valve assembly moved to a second vertical position in accordance with the first embodiment.

The vapor valve section 46 is attached to the interior side 50c (or underside) of the plate 50 of the attachment section 40. In FIGS. 24 and 25, various features of the plate 50, such as the fuel tube 56 and the connector 58 are omitted for the sake of clarity and simplicity.

The vapor valve section 46 basically includes a first valve assembly 120 (a first air flow valve assembly) and a second valve assembly 122 (a second air flow valve assembly). The first valve assembly 120 supported below the plate 50 and is aligned with a vapor passageway of the first tube 52. The first tube 52 basically extends through the plate 50 of the attachment section 40 as shown in FIGS. 24 and 25.

The first valve assembly 120 includes a first tube 130, a second tube 132 (a first housing portion), a housing 134 (a second housing portion), a valve seat portion 136 and a float 138. The first tube 130 is rigidly fixed to the interior side 50c of the plate 50. The first tube 130 is hollow and is aligned with the vapor passageway of the first tube 52. The second tube 132 is also rigidly fixed to the interior side 50c of the plate 50 such that the second tube 132 is concentric with the first tube 130 and surrounds the first tube 130. A hollow annular channel 132a is defined between at least a portion of the first tube 130 and the second tube 132.

The housing 134 has a lower portion that defines a float chamber 134a. An upper portion of the housing 134 defines an annular attachment flange 134b that contacts and slides along an outer surface of the second tube 132, such that the annular attachment flange creates a seal between the housing 134 and the second tube 132. Hence, the housing 134 is slidably supported on the second tube 132, as demonstrated by a comparison of the depictions in FIGS. 24 and 25. Specifically, the housing 134 can slide up and down along the second tube 132 in order to accommodate installation into any of a variety of fuel tanks and fuel tank configurations.

Figure 26:
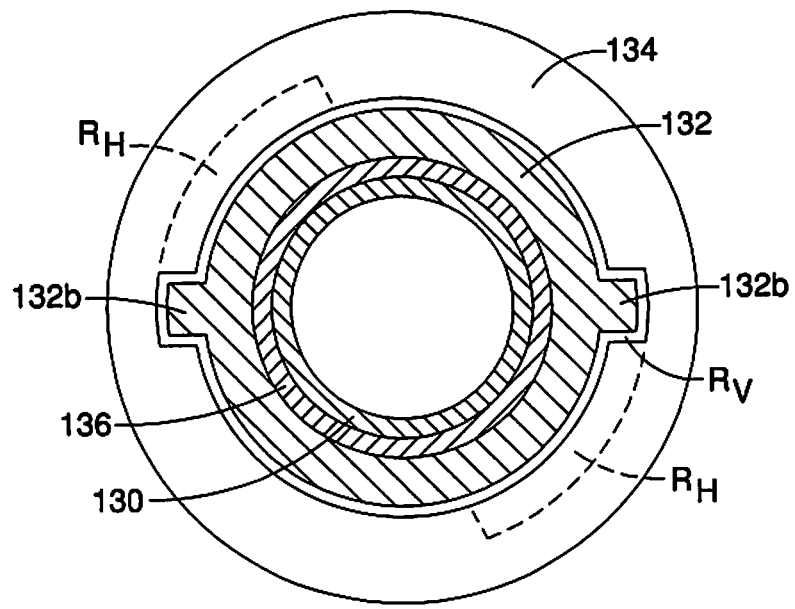
FIG. 26 is a cross-sectional view of a portion of the first valve assembly showing details of a recess and projection arrangement that is used to lock the first valve assembly in any one of a plurality of vertical positions including the first and second vertical positions depicted in FIGS. 24 and 25, in accordance with a first embodiment.
Figure 27:
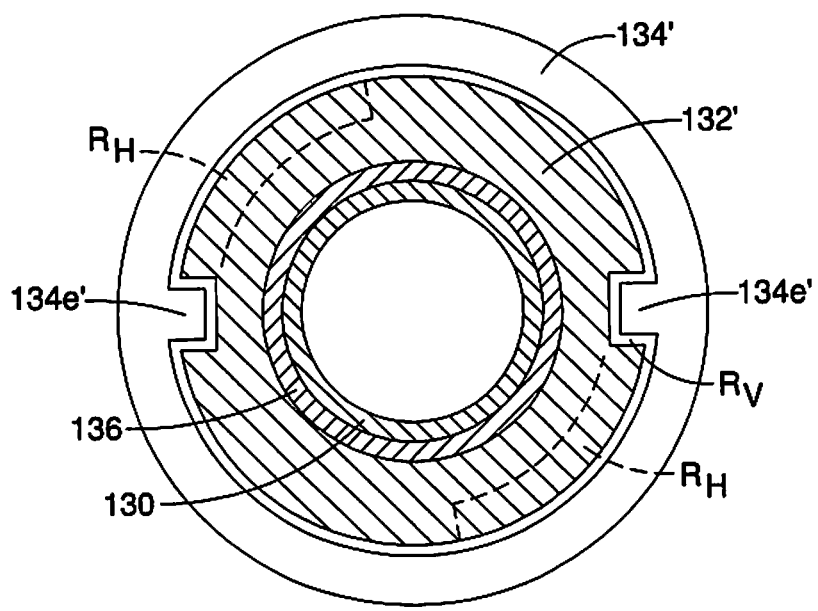
FIG. 27 is a cut-away view of the portion of the first valve assembly showing details of the recess and projection arrangement that is used to lock the first valve assembly in any one of the plurality of vertical positions including the first and second vertical positions depicted in FIGS. 24 and 25, in accordance with the first embodiment.

In the depicted embodiment, the second tube 132 includes a pair of projections 132b and the housing 134 defines a pair of recesses along an interior surface thereof, the recesses each having that a vertical portion $R_V$ and a plurality of horizontal recess portions $R_H$ that extend to the vertical portion $R_V$. The projections 132b of the second tube 132 extend the recess and can be moved along the vertical portion $R_V$ or into any one of the plurality of horizontal recess portions $R_H$. The projections 132b, the horizontal recess portions $R_H$ and the vertical portion $R_V$ are also shown in FIGS. 26 and 27.

In order to re-position the housing 134 relative to the second tube 132, the housing 134 can be rotated relative to the second tube 132 in order to align the projections 132b with the vertical portion $R_V$. The housing 134 can then be repositioned vertically relative to the second tube 132 with the projections 132b remaining in the vertical portion $R_V$ of the recess. In order to lock the housing 134 in one of a plurality of vertical positions relative to the second tube 132, the housing 134 is rotated in order to move the projections 132b into ones of the plurality of horizontal recess portions $R_H$. The vertical portion $R_V$, the plurality of horizontal recess portions $R_H$ and the projections 132b (parts of the first housing portion and the second housing portion) define a position locking mechanism that retains the housing 134 (the second housing portion) in one of a plurality of positions relative to the second tube 132 (the first housing portion).

Figure 28:
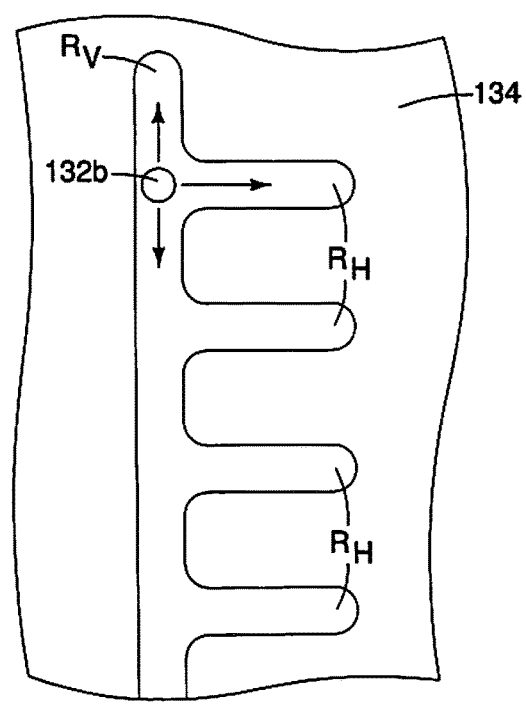
FIG. 28 is another cross-sectional view of a portion of the first valve assembly showing details of an alternative configuration of a recess and projection arrangement used to lock the first valve assembly in any one of a plurality of vertical positions, in accordance with the first embodiment.

As shown in FIG. 28, it is also possible to reverse the locations of the projections and recesses of the first valve assembly 120. Specifically, the housing 134 and second tube 132 can be modified or replaced with a housing 134' and a second tube 132'. The housing 134' is provided with projections 134e' that extend into the recesses $R_V$ and $R_H$ formed in the second tube 132'.

The valve seat portion 136 is rigidly attached to an interior portion of the housing 134 for movement with the housing 134. The valve seat portion 136 includes a sleeve part 136a, an engagement part 136b and a seat part 136c. The sleeve part 136a is dimensioned to fit around an outer periphery of the first tube 130 and slide within the hollow annular channel 132a. More specifically, the sleeve part 136a can undergo telescoping movement relative to the first tube 130. The engagement part 136b of the valve seat portion 136 extends into the float chamber 134a and defines the seat part 136c. The engagement part 136b is coupled to the housing 134 for movement therewith. The valve seat portion 136 defines a central bore 136d open to the vapor passageway of the first tube 56 and is open to the seat part 136c.

The float 138 is disposed within the float chamber 134a and is freely movable within the float chamber 134a. Consequently, in response to fluid entering the float chamber 134a via openings 134c, the float 138 floats up against the seat part 136c closing off the central bore 136d and the vapor passageway of the first tube 52. In the absence of fluid, the float 138 moves downward in the float chamber 134a exposing the seat part 136c and the central bore 136d allowing vapor movement through the vapor passageway of the first tube 52.

The second valve assembly 122 is similar to the first valve assembly 120 in configuration and operation. Specifically the second valve assembly 122 includes a third tube 140, a fourth tube 142 (a third housing portion), a housing 144 (a fourth housing portion), a valve seat portion 146 and a float 148. The third tube 140 is rigidly fixed to the interior side 50c of the plate 50. The third tube 140 is hollow and is aligned with the vapor passageway of the second tube 54. The fourth tube 142 is also rigidly fixed to the interior side 50c of the plate 50 such that the fourth tube 142 is concentric with the third tube 140 and surrounds the third tube 140. A hollow annular channel 142a is defined between at least a portion of the third tube 140 and the fourth tube 142.

The housing 144 has a lower portion that defines a float chamber 144a. An upper portion of the housing 144 defines an annular attachment flange 144b that contacts and slides along an outer surface of the fourth tube 142, such that the annular attachment flange creates a seal between the housing 144 and the fourth tube 142. Hence, the housing 144 is slidably supported on the fourth tube 142, as demonstrated by a comparison of the depictions in FIGS. 24 and 25. Specifically, the housing 144 can slide up and down along the fourth tube 142 in order to accommodate installation into any of a variety of fuel tanks and fuel tank configurations.

In the depicted embodiment, the fourth tube 142 includes a pair of projections 142b and the housing 144 defines a pair of recesses along an interior surface thereof, the recesses each having that a vertical portion $R_V$ and a plurality of horizontal recess portions $R_H$ that extend to the vertical portion $R_V$ similar to the recess in the housing 132. The projections 142b of the fourth tube 142 extend the recess and can be moved along the vertical portion $R_V$ or into any one of the plurality of horizontal recess portions $R_H$.

In order to re-position the housing 144 relative to the fourth tube 142, the housing 144 can be rotated relative to the fourth tube 142 in order to align the projections 142b with the vertical portion $R_V$. The housing 144 can then be repositioned vertically relative to the fourth tube 142 with the projections 142b remaining in the vertical portion $R_V$ of the recess. In order to lock the housing 144 in one of a plurality of vertical positions relative to the fourth tube 142, the housing 144 is rotated in order to move the projections 142b into ones of the plurality of horizontal recess portions $R_H$. The vertical portion $R_V$, the plurality of horizontal recess portions $R_H$ and the projections 142b (parts of the third housing portion and the fourth housing portion) define a position locking mechanism that retains the housing 144 (the fourth housing portion) in one of a plurality of positions relative to the fourth tube 142 (the third housing portion). Since the vertical portion $R_V$ and the plurality of horizontal recess portions $R_H$ are generally the same as those in the first valve assembly 120, the depictions in FIGS. 26 and 27 also apply to the recess in the second valve assembly 122. Therefore, for the sake of brevity, a depiction of the recess in the second valve assembly 122 is omitted.

The valve seat portion 146 is rigidly attached to an interior portion of the housing 144 for movement with the housing 144. The valve seat portion 146 includes a sleeve part 146a, an engagement part 146b and a seat part 146c. The sleeve part 146a is dimensioned to fit around an outer periphery of the third tube 140 and slide within the hollow annular channel 142a. More specifically, the sleeve part 146a can undergo telescoping movement relative to the third tube 140. The engagement part 146b of the valve seat portion 146 extends into the float chamber 144a and defines the seat part 146c. The engagement part 146b is coupled to the housing 144 for movement therewith. The valve seat portion 146 defines a central bore 146d open to the vapor passageway of the first tube 56 and is open to the seat part 146c.

The float 148 is disposed within the float chamber 144a and is freely movable within the float chamber 144a. Consequently, in response to fluid entering the float chamber 144a via openings 144c, the float 148 floats up against the seat part 146c closing off the central bore 146d and the vapor passageway of the second tube 54. In the absence of fluid, the float 148 moves downward in the float chamber 144a exposing the seat part 146c and the central bore 146d allowing vapor movement through the vapor passageway of the second tube 54.

The vertical positioning adjustment of each of the first valve assembly 120 and the second valve assembly 122 are provided to give further flexible installation features to the fuel pump assembly 14.

When the fuel tank 12 is full of fuel, at least the first valve assembly 120 is closed since the float 138 moves up into contact with the seat part 136c of the valve seat portion 136. In this case, the second valve assembly 122 allows vapor to escape the fuel tank 12 when the fuel tank 12 is full and the first valve assembly 120 is closed.

In the event that the vehicle 10 rolls over, the float 138 contacts and seals with the seat part 136c of the valve seat portion 136 and the float 148 contacts and seals with the seat part 146c of the valve seat portion 146 thereby preventing fuel from escaping the fuel tank 12.

It should be understood from the drawings and the description herein that the first valve assembly 120 and the second valve assembly 122 can be connected to differing vapor lines of the fuel vapor management system 30 or the same vapor line of the fuel vapor management system 30, as needed or designed.

Second Embodiment

Figure 29:
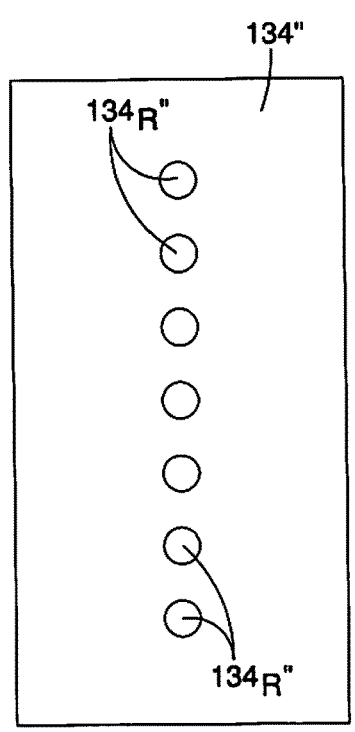
FIG. 29 is a cutaway view of a portion of the first valve assembly showing a locking mechanism in accordance with a second embodiment.
Figure 30:
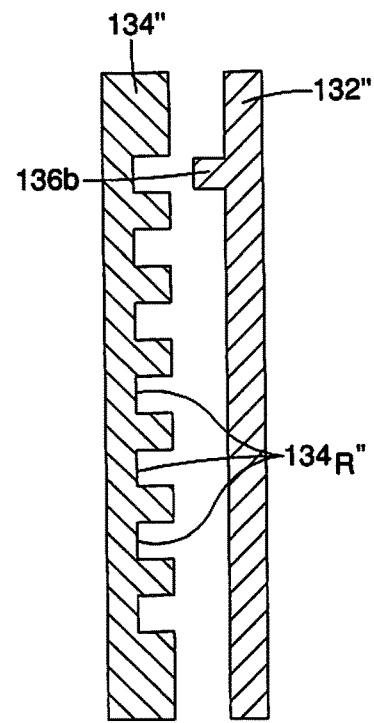
FIG. 30 is a cross-sectional view of the portion of the first valve assembly depicted in FIG. 29 showing further details of the locking mechanism in accordance with the second embodiment.

Referring now to FIGS. 29 and 30, a second tube 132" and a housing 134" in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a double prime (").

The first and second valve assemblies 120 and 122 described in the first embodiment can be modified to include a different position locking arrangement. Specifically, the second tube 132 and the housing 134 of the first embodiment can be replaced with the second tube 132 the housing 134" and the housing 134" of the second embodiment. The housing 134" is provided with a series of recesses 134"$_R$ and the second tube 132" is provided with projections 132"$_B$.

The controller 24 preferably includes a microcomputer with a fuel pump assembly control program that controls the fuel pump 76 and processes signals from the sender unit 90. The controller 24 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 24 can be any combination of hardware and software that will carry out the functions of the present invention.

The various vehicle elements not described herein are conventional components that are well known in the art. Since these elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having"

and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the fuel pump assembly. Accordingly, these terms, as utilized to describe the present invention should be interpreted relative to a vehicle equipped with the fuel pump assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A fuel tank vapor valve assembly, comprising:
   an attachment section having an upper surface and a lower surface;
   at least one tube extending through the attachment section defining a vapor passageway that extends from the upper surface to a point below and spaced apart from the lower surface;
   a housing including a first housing portion and a second housing portion, the first housing portion being fixedly attached to the attachment section and having a hollow interior with the at least one tube extending into the hollow interior, the second housing portion being coupled to the first housing portion for movement between at least a first position and a second position relative to the attachment section, the second housing portion defining a float chamber below the at least one tube, the first housing portion and the second housing portion defining a position locking mechanism therebetween the position locking mechanism being defined by a recess formed along an inner surface of the second housing portion and a projection formed on the first housing portion, the recess including a vertical recess portion and a plurality of horizontal recess portions vertically spaced apart from one another, each of the plurality of horizontal recess portions extending from the vertical recess portion, the projection extending into the recess, the second housing portion being configured for limited rotation about the first housing portion and vertical movement relative to the first housing portion such that the projection can be positioned within any one of the plurality of horizontal recess portions via sliding movement along the vertical recess portion, with the projection being positioned within a first of the plurality of horizontal recess portions the first position of the second housing portion is defined, and with the projection being positioned within a second of the horizontal recess portion the second position of the second housing relative to the attachment section is defined;
   a valve seat portion located within the float chamber, the valve seat portion having an engagement part, a sleeve part, and a seat surface, the engagement part being coupled to the second housing portion for movement therewith, the sleeve part being in telescoping engagement with the at least one tube such that the sleeve part telescopically moves along the at least one tube with the second housing portion the valve seat portion defining a central bore open to the vapor passageway and the seat surface; and
   a float freely movable within the float chamber such that in response to fluid entering the float chamber the float floats up against the seat surface closing off the central bore and the vapor passageway and in the absence of fluid moves downward in the float chamber exposing the seat surface and the central bore allowing vapor movement through the vapor passageway.

2. The fuel tank vapor valve assembly according to claim 1, wherein
   the second housing portion includes at least one wall that defines a plurality of fluid openings that extend from the float chamber to an outer surface of the at least one wall.

3. The fuel tank vapor valve assembly according to claim 1, further comprising
   a second tube extending through the attachment section defining a second vapor passageway that extends from the upper surface to a second point that is spaced apart from the lower surface and the at least one tube;
   a second housing supported to the attachment section for movement between at least a third position and a fourth position relative to the attachment section, the second housing defining a second float chamber below the second tube;
   a second valve seat portion located within the second float chamber, the second valve seat portion having a second engagement part, a second sleeve part, and a second seat surface, the second engagement part being coupled to the second housing for movement therewith, the second sleeve part being in telescoping engagement with the second tube such that the second sleeve part telescopically moves along the second tube with the second housing, the second valve seat portion defining a second central bore open to the second vapor passageway and the second seat surface; and a second float freely movable within the second float chamber such that in response to fluid entering the second float chamber the second float floats up against the second seat surface closing off the second central bore and the second vapor passageway and in the absence of fluid moves downward in the second float chamber exposing the second seat surface and the second central bore allowing vapor movement through the second vapor passageway.

4. The fuel tank vapor valve assembly according to claim 3, wherein
the second housing includes a third housing portion and a fourth housing portion,
the third housing portion being fixedly attached to the attachment section and having a second hollow interior with the second tube extending into the second hollow interior, and
the fourth housing portion being coupled to the third housing portion for movement between at least the third position and the fourth position relative to the third housing portion and the attachment section, the fourth housing portion defining the second float chamber.

5. The fuel tank vapor valve assembly according to claim 4, wherein
the fourth housing portion includes at least one wall that defines a plurality of fluid openings that extend from the second float chamber to an outer surface of the at least one wall.

6. The fuel tank vapor valve assembly according to claim 1, wherein
a fuel pump located below the housing and being supported to the attachment section.

7. The fuel tank vapor valve assembly according to claim 6, wherein
a sender unit connected to fuel pump, the sender unit including a float configured to move linearly in a vertical direction relative to the fuel pump in response to changes in level of fuel.

8. The fuel tank vapor valve assembly according to claim 1, further comprising
a second vapor valve housing supported to the attachment section for movement between at least a third position and a fourth position relative to the attachment section, the second vapor valve housing including a second vapor passageway, the second vapor passageway having a minimum diameter that is less than a minimum diameter of the vapor passageway diameter,
the housing having a first end and a second end opposite the first end, the housing having an overall length measured from the first end to the second end, and
the second vapor valve housing having a third end and a fourth end opposite the third end, the second vapor valve housing having a second overall length, the first length being greater than the second length.

9. A fuel tank vapor valve assembly, comprising:
an attachment section having an upper surface and a lower surface;
at least one tube extending through the attachment section defining a vapor passageway that extends from the upper surface to a point below and spaced apart from the lower surface;
a first housing portion fixedly attached to the attachment section and having a hollow interior with the vapor tube extending into the hollow interior;
a second housing portion coupled to the first housing portion for movement between at least a first position and a second position relative to the first housing portion, the second housing portion defining a float chamber below the vapor tube;
a locking mechanism defined by the first housing portion and the second housing portion, the position locking mechanism being defined by a recess defined along a surface of one of the first housing portion and the second housing portion and a projection formed on the other of the first housing portion and the second housing portion, the recess including a vertical recess portion and a plurality of horizontal recess portions vertically spaced apart from one another, each of the plurality of horizontal recess portions extending from the vertical recess portion and being vertically spaced apart from one another, the projection extending into the recess, the second housing portion being configured for limited rotation about the first housing portion and vertical movement relative to the first housing portion such that the projection can be positioned within any one of the plurality of horizontal recess portions via sliding movement along the vertical recess portion, with the projection being positioned within a first of the plurality of horizontal recess portions the first position of the second housing portion is defined, and with the projection being positioned within a second of the horizontal recess portion the second position of the second housing is defined relative to the attachment section;
a valve seat portion located within the float chamber, the valve seat portion having an engagement part, a sleeve part, and a seat surface, the engagement part being coupled to the second housing portion for movement therewith, the sleeve part being in telescoping engagement with the at least one tube such that the sleeve part telescopically moves along the at least one tube with the second housing part, the valve seat portion defining a central bore open to the vapor passageway and the seat surface; and
a float freely movable within the float chamber such that in response to fluid entering the float chamber the float floats up against the seat surface closing off the central bore and the vapor passageway and in the absence of fluid moves downward in the float chamber exposing the seat surface and the central bore allowing vapor movement through the vapor passageway.

10. The fuel tank vapor valve assembly according to claim 9, further comprising
a second tube extending through the attachment section defining a second vapor passageway that extends from the upper surface to a second point that is spaced apart from the lower surface and the at least one tube;
a housing supported to the attachment section for movement between at least a third position and a fourth position relative to the attachment section, the housing defining a second float chamber below the second tube;
a second valve seat portion located within the second float chamber, the second valve seat portion having a second engagement part, a second sleeve part, and a second seat surface, the second engagement part being coupled to the housing for movement therewith, the second sleeve part being in telescoping engagement with the second tube such that the second sleeve part telescopically moves along the second tube with the housing, the second valve seat portion defining a second central bore open to the second vapor passageway and the second seat surface; and a second float freely movable within the second float chamber such that in response to fluid entering the second float chamber the second float floats up against the second seat surface closing off the second central bore and the second vapor passageway and in the absence of fluid moves downward in the second float chamber exposing the second seat surface and the second central bore allowing vapor movement through the second vapor passageway.

11. The fuel tank vapor valve assembly according to claim 10, wherein
the housing includes a third housing portion and a fourth housing portion,
the third housing portion being fixedly attached to the attachment section and having a second hollow interior with the second tube extending into the second hollow interior, and
the fourth housing portion being coupled to the third housing portion for movement between at least the third position and the fourth position relative to the third housing portion and the attachment section, the fourth housing portion defining the second float chamber.

12. The fuel tank vapor valve assembly according to claim 11, wherein
the fourth housing portion includes at least one wall that defines a plurality of fluid openings that extend from the second float chamber to an outer surface of the at least one wall.

13. The fuel tank vapor valve assembly according to claim 10, wherein
a fuel pump supported to the attachment section and located below both the housing and the second housing portion.

14. The fuel tank vapor valve assembly according to claim 13, wherein
a sender unit connected to fuel pump, the sender unit including a float configured to move linearly in a vertical direction relative to the fuel pump in response to changes in level of fuel.

15. The fuel tank vapor valve assembly according to claim 11, further comprising
the second housing portion has a first end and a second end opposite the first end, the second housing portion having an overall length measured from the first end to the second end, and
the fourth housing portion has a third end and a fourth end opposite the third end, the fourth vapor valve housing having a second overall length, the first length being greater than the second length.

16. The fuel tank vapor valve assembly according to claim 9, wherein
the recess is formed on a surface of the first housing portion and the projection is formed on a surface of the second housing portion.

17. The fuel tank vapor valve assembly according to claim 9, wherein
the recess is formed on a surface of the second housing portion and the projection is formed on a surface of the first housing portion.

* * * * *